United States Patent
Ogihara

(10) Patent No.: US 9,507,664 B2
(45) Date of Patent: Nov. 29, 2016

(54) STORAGE SYSTEM INCLUDING A PLURALITY OF STORAGE UNITS, A MANAGEMENT DEVICE, AND AN INFORMATION PROCESSING APPARATUS, AND METHOD FOR CONTROLLING THE STORAGE SYSTEM

(71) Applicant: FUJITSU LIMITED, Kawasaki-shi, Kanagawa (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 107 days.

(21) Appl. No.: 14/208,145

(22) Filed: Mar. 13, 2014

(65) Prior Publication Data

US 2014/0337665 A1    Nov. 13, 2014

(30) Foreign Application Priority Data

May 7, 2013    (JP) ................................ 2013-097648

(51) Int. Cl.
*G06F 11/00* (2006.01)
*G06F 11/10* (2006.01)

(52) U.S. Cl.
CPC ................. *G06F 11/1092* (2013.01)

(58) Field of Classification Search
CPC ................ G06F 11/2069; G06F 11/2092
USPC .................................. 714/6.21, 6.3
See application file for complete search history.

(56) References Cited

U.S. PATENT DOCUMENTS

| | | | | |
|---|---|---|---|---|
| 7,814,272 B2* | 10/2010 | Barrall | ................... | G06F 3/0607 711/114 |
| 8,489,835 B2* | 7/2013 | Kasako | ............... | G06F 11/2058 707/613 |
| 8,522,075 B2* | 8/2013 | Makino | ................. | G06F 11/201 714/43 |
| 8,667,337 B2* | 3/2014 | Itoyama | .............. | G06F 11/0727 714/42 |
| 9,213,497 B2* | 12/2015 | Noda | ..................... | G06F 3/0647 |
| 2005/0081087 A1 | 4/2005 | Yagisawa et al. | | |
| 2006/0190682 A1* | 8/2006 | Noguchi | ................... | G06F 9/52 711/114 |
| 2008/0263393 A1* | 10/2008 | Shirogane | ........... | G06F 11/1088 714/6.32 |
| 2008/0313497 A1* | 12/2008 | Hirakawa | .......... | G06F 11/2058 714/15 |
| 2009/0024792 A1* | 1/2009 | Arai | ..................... | G06F 11/1092 711/114 |

FOREIGN PATENT DOCUMENTS

| | | |
|---|---|---|
| JP | 2005-100259 | 4/2005 |
| JP | 2009-187406 | 8/2009 |

* cited by examiner

*Primary Examiner* — Elmira Mehrmanesh
(74) *Attorney, Agent, or Firm* — Staas & Halsey LLP

(57) ABSTRACT

A first processor is configured to receive allocation of storage devices and configure a group by involving the allocated storage devices. Each of the allocated storage devices is contained in different storage units. The first processor is configured to detect a failure of a first storage device included in the group. The first storage device is contained in a first storage unit of the different storage units. The first processor is configured to receive allocation of a second storage device from a second storage unit of the different storage units and reconfigure the group by involving the second storage device in place of the first storage device. The first processor is configured to receive allocation of a third storage device from a third storage unit and replicate the second storage device in the third storage device. The third storage unit is not of the different storage units.

8 Claims, 19 Drawing Sheets

FIG. 6

| RAID GROUP ID | BLOCK NO. | STATUS | DISK ENCLOSURE ID | DISK ID |
|---|---|---|---|---|
| #0001 | 1 | PHYSICAL | #A | #1 |
| #0001 | 2 | PHYSICAL | #B | #1 |
| #0001 | 3 | PHYSICAL | #C | #1 |
| #0001 | 4 | PHYSICAL | #D | #1 |

| RAID GROUP ID | BLOCK NO. | STATUS | DISK ENCLOSURE ID | DISK ID |
|---|---|---|---|---|
| #0001 | 1 | RAID1 | #B | #2 |
| #0001 | 1 | RAID1 | #C | #2 |
| #0001 | 2 | PHYSICAL | #B | #1 |
| #0001 | 3 | PHYSICAL | #C | #1 |
| #0001 | 4 | PHYSICAL | #D | #1 |

| RAID GROUP ID | BLOCK NO. | STATUS | DISK ENCLOSURE ID | DISK ID |
|---|---|---|---|---|
| #0001 | 1 | RAID1 | #C | #2 |
| #0001 | 1 | RAID1 | #D | #3 |
| #0001 | 2 | RAID1 | #C | #3 |
| #0001 | 2 | RAID1 | #D | #2 |
| #0001 | 3 | PHYSICAL | #C | #1 |
| #0001 | 4 | PHYSICAL | #D | #1 |

52

STORAGE SYSTEM INCLUDING A PLURALITY OF STORAGE UNITS, A MANAGEMENT DEVICE, AND AN INFORMATION PROCESSING APPARATUS, AND METHOD FOR CONTROLLING THE STORAGE SYSTEM

CROSS-REFERENCE TO RELATED APPLICATION

This application is based upon and claims the benefit of priority from the prior Japanese Patent Application No. 2013-097648 filed on May 7, 2013, the entire contents of which are incorporated herein by reference.

FIELD

The embodiments discussed herein are related to a storage system and a method for controlling a storage system.

BACKGROUND

A storage system configured with a plurality of disks as a redundant array of independent disks (RAID) to ensure availability and reliability are known. In case of a failure of disks included in a RAID, shared spare disks may be prepared for a plurality of RAID groups in the storage system or spare disks dedicated to a specific RAID group may be prepared. When a disk failure occurs, the storage system conducts recovery from the failure through a rebuild process involving a spare disk.

Related techniques are disclosed in, for example, Japanese Laid-open Patent Publication No. 2009-187406 and Japanese Laid-open Patent Publication No. 2005-100259.

However, a storage system may manage a multitude of disks as a disk pool by providing a plurality of storage units called disk boxes or disk enclosures that are able to accommodate a certain number of disks.

While this type of storage system configures a RAID with each disk in a different storage unit to address reliability, when a rebuild process involving a spare disk is conducted due to a disk failure, a plurality of disks included in the RAID may contained in the same storage unit. In this case, when a failure occurs at the storage unit level, the storage system may suffer from data loss due to the failure of the plurality of disks at the same time.

SUMMARY

According to an aspect of the present invention, provided is a storage system including a plurality of storage units, a management device, and an information processing apparatus. Each of the plurality of storage units contains a plurality of storage devices. The management device manages storage devices contained in the plurality of storage units. The information processing apparatus includes a first processor. The first processor is configured to receive allocation of storage devices by the management device. Each of the allocated storage devices is contained in different storage units of the plurality of storage units. The first processor is configured to configure a group by involving the allocated storage devices. The first processor is configured to detect a failure of a first storage device included in the group. The first storage device is contained in a first storage unit of the different storage units. The first processor is configured to receive allocation of a second storage device from a second storage unit of the different storage units. The second storage unit is different from the first storage unit. The first processor is configured to reconfigure the group by involving the second storage device in place of the first storage device. The first processor is configured to receive allocation of a third storage device from a third storage unit of the plurality of storage units. The third storage unit is not of the different storage units. The first processor is configured to replicate the second storage device in the third storage device.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of RAID configuration information according to the second embodiment;

FIG. 12 is a diagram illustrating an example of RAID configuration information according to the second embodiment;

FIG. 18 is a diagram illustrating an example of RAID configuration information according to the third embodiment;

DESCRIPTION OF EMBODIMENTS

Embodiments will be described in detail with reference to the accompanying drawings.

First Embodiment

Figure 1:
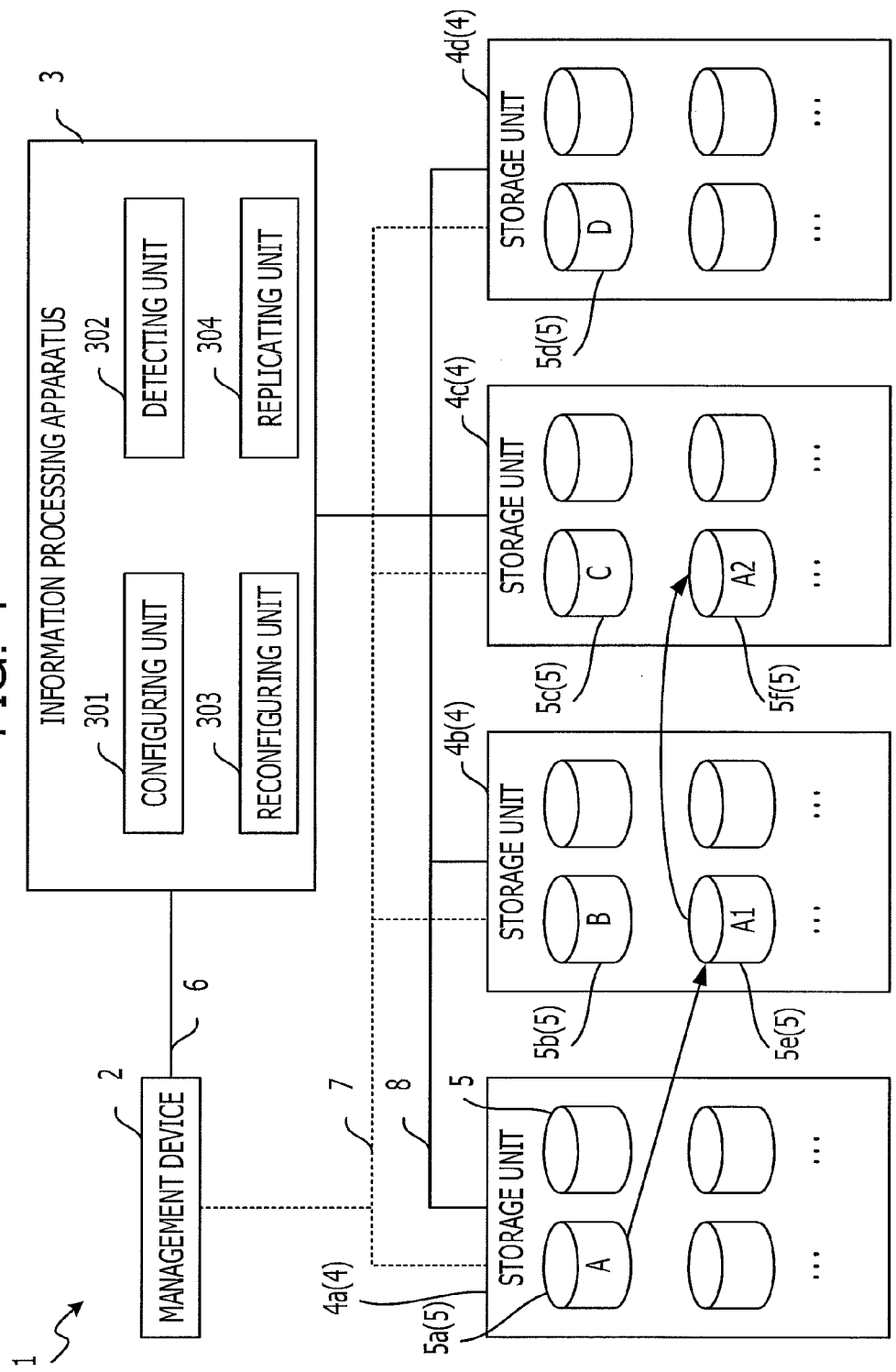
FIG. 1 is a diagram illustrating an exemplary configuration of a storage system according to a first embodiment.

A storage system according to a first embodiment will be described with reference to FIG. 1. FIG. 1 is a diagram illustrating an exemplary configuration of a storage system according to the first embodiment.

A storage system 1 includes a management device 2, an information processing apparatus 3, and a plurality of storage units 4. While the storage system 1 illustrated in FIG. 1 includes four storage units 4 (4a, 4b, 4c, 4d), the storage system 1 may include three storage units 4 or five or more storage units 4.

Each storage unit 4 includes a plurality of storage devices 5. The storage unit 4 is, for example, a disk box or a disk enclosure and contains a plurality of storage devices 5. The storage unit 4 carries out power supply, cooling, and required controls for the plurality of storage devices 5 contained therein. Each storage device 5 is a device that is able to store data and is, for example, a hard disk drive (HDD) or a solid state drive (SSD).

The management device 2 manages storage resources in the storage system 1 and carries out allocation of the storage devices 5 to the information processing apparatus 3. The management device 2 is connected to the storage units 4 via a communication path 7 and manages the storage units 4 and the storage devices 5 contained in the storage units 4. The management device 2 is connected to the information processing apparatus 3 via a communication path 6 and manages connections between the information processing apparatus 3 and the storage devices 5.

The information processing apparatus 3 receives allocation of storage resources by the management device 2 and stores data in the allocated storage resources. The information processing apparatus 3 is connected to the storage units 4 via a communication path 8 and is connected to the allocated storage resources, that is, the allocated storage devices 5.

The information processing apparatus 3 includes a configuring unit 301, a detecting unit 302, a reconfiguring unit 303, and a replicating unit 304. The configuring unit 301 receives allocation of storage devices 5 respectively from different storage units 4 and configures a group with the allocated storage devices 5. The group is, for example, a RAID group. RAID-5 is an example of one type of RAID group. In the example illustrated in FIG. 1, a RAID group is configured with storage devices 5a, 5b, 5c, and 5d respectively storing data "A", "B", "C", and "D". The storage devices 5a, 5b, 5c, and 5d are respectively contained in different storage units 4a, 4b, 4c, and 4d.

By allocating the storage devices 5 configured as a group from different storage units 4 in this way, the storage system 1 reduces the risk of data loss due to a simultaneous failure of a plurality of storage devices 5 in the group.

The detecting unit 302 detects failures of the storage devices 5 configured as a group. The detecting unit 302 is able to detect a failure of a storage device 5 connected via the communication path 8. The detecting unit 302 is also able to detect a failure of a storage device 5 by a report from the management device 2 connected via the communication path 6. The detecting unit 302 is also able to detect a failure of a storage unit 4 in which the storage devices 5 are contained by a report from the management device 2.

When the detecting unit 302 detects a failure of a storage device 5 configured in a group, the reconfiguring unit 303 removes the storage device 5 in which the failure is detected from the group configuration. The reconfiguring unit 303 receives a new allocation of a storage device 5 and reconfigures the group with the newly allocated storage device 5. At this time, the reconfiguring unit 303 preferably receives, as in the case of group configuring by the configuring unit 301, allocation of the new storage device 5 from a storage unit 4 different from storage units 4 containing storage devices 5 in which a failure has not been detected. However, depending on the condition of the storage resources, the reconfiguring unit 303 may have no choice but receive the allocation of a storage device 5 from a storage unit 4 that contains a storage device 5 in which a failure has not been detected. In this case, the reconfiguring unit 303 receives the allocation of a storage device 5 from one of the storage units 4 that contain a storage device 5 in which a failure has not been detected, and reconfigures the group with the allocated storage device 5.

In the example of the group configuration illustrated in FIG. 1, when a failure is detected in the storage device 5a, the reconfiguring unit 303 receives allocation of the storage device 5e from the storage unit 4b that contains the storage device 5b. Therefore, the reconfiguring unit 303 reconfigures the group so that the data "A1 (A)", "B", "C", and "D" is respectively stored in storage devices 5e, 5b, 5c, and 5d after the detection of the failure in storage device 5a. The storage devices 5e and 5b both contained in the storage unit 4b, and the storage devices 5c and 5d respectively contained in the storage units 4c and 4d. If a failure occurs in the storage unit 4b at this time, failures may also occur in the storage devices 5e and 5b and the loss of data may occur.

The replicating unit 304 receives allocation of a storage device 5 from a storage unit 4 that is different from the storage unit 4 containing the storage device 5 allocated to the reconfiguring unit 303 among the storage units 4 that contain storage devices 5 in which failures have not been detected. The replicating unit 304 replicates the storage device 5 allocated to the reconfiguring unit 303 to the storage device 5 allocated to the replicating unit 304.

In the example of the group configuration illustrated in FIG. 1, the replicating unit 304 receives the allocation of the storage device 5 from a storage unit 4 other than the storage unit 4b since both the storage devices 5e and 5b contained in the storage unit 4b. In this case, the replicating unit 304 receives the allocation of a storage device 5f from the storage unit 4c that contains the storage device 5c. The replicating unit 304 replicates the storage device 5e to the storage device 5f. Therefore, the replicating unit 304 configures RAID-1 in which the storage devices 5e and 5f respectively store the data "A1 (A)" and "A2 (A)"

As a result, the storage system 1 does not suffer from data loss even if a failure occurs in any of the storage units 4b, 4c, or 4d. The storage system 1 is able to suppress the number of storage devices 5 to be used for group configuration by reducing the replication required for RAID-1. Therefore, the storage system 1 is able to build a system with superior fault tolerance at a low cost.

Second Embodiment

Figure 2:
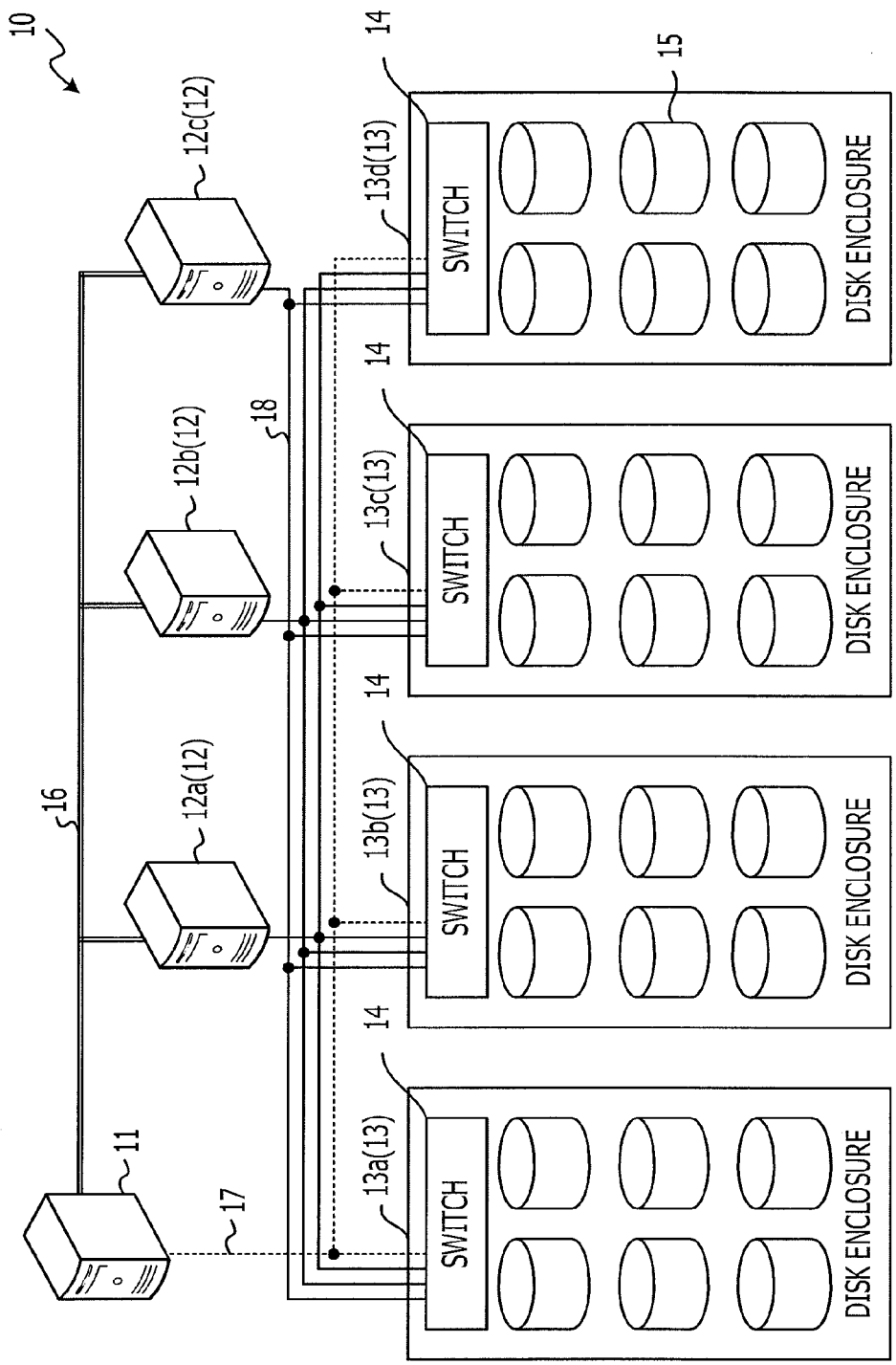
FIG. 2 is a diagram illustrating an exemplary configuration of a storage system according to a second embodiment.

A configuration of a storage system according to a second embodiment will be described with reference to FIG. 2. FIG. 2 is a diagram illustrating an exemplary configuration of a storage system according to the second embodiment.

A storage system 10 includes a resource manager 11, a plurality of servers 12, and a plurality of disk enclosures 13. Each disk enclosure 13 accommodates a plurality of disks 15 as storage resources. While the disk enclosures 13 illustrated in FIG. 2 contain six disks 15, two or more disks 15 may be contained. The disks 15 are storage devices that are able to store data and examples of the disks 15 are HDDs, SSDs, and the like.

Each disk enclosure 13 includes a switch 14 used for connecting and disconnecting the disks 15 with an external device (server 12). The switch 14 is controlled by the resource manager 11 and is connected to the resource manager 11 by a communication path 17.

The storage system 10 is able to replace or increase and decrease the storage resources in units of the disk enclosures 13. While the storage system 10 illustrated in FIG. 2 includes four disk enclosures 13 (13a, 13b, 13c, 13d), three, five, or more disk enclosures 13 may be included.

The resource manager 11 is a management device for managing the storage resources in the storage system 10 and carries out the allocation of the disks 15 to the servers 12. The resource manager 11 is connected to the disk enclosures 13 via the communication path 17 and manages the disk enclosures 13 and the disks 15 contained in the disk enclosures 13. The resource manager 11 is connected to the servers 12 via a communication path 16 and manages the connections between the servers 12 and the disks 15.

The resource manager 11 conducts allocation of a disk 15 to a server 12 by controlling a switch 14 to connect the server 12 with the disk 15. The resource manager 11 cancels the allocation of the disk 15 to the server 12 by controlling the switch 14 to disconnect the server 12 with the disk 15. While the storage system 10 illustrated in FIG. 2 includes one resource manager 11, two or more resource managers 11 may be included in order to assure redundancy or allow for load distribution.

The servers 12 are information processing apparatuses that receive allocations of storage resources by the resource manager 11 in the storage system 10. Each server 12 is connected via a communication path 18 to the switches 14 that are provided in the respective disk enclosures 13. Each server 12 is able to recognize, based on hot-plugging, a connection or disconnection with the disks 15 connected via the switches 14. While the storage system 10 illustrated in FIG. 2 includes three servers 12 (12a, 12b, 12c), any number of servers 12 may be included.

A server 12 receives allocation of the disks 15 from the plurality of disk enclosures 13 and configures a RAID group (e.g., RAID-5). The server 12 may configure a plurality of RAID groups and each of the RAID groups may be distinguished by identification information. In this way, the storage system 10 reduces the risk of data loss due to simultaneous failures of a plurality of disks 15 included in a RAID group, by allocating the disks 15 included in a RAID group from different disk enclosures 13.

While the plurality of servers 12 are each connected to the plurality of disk enclosures 13 via the communication path 18, the servers 12 may be connected by other switches.

Figure 3:
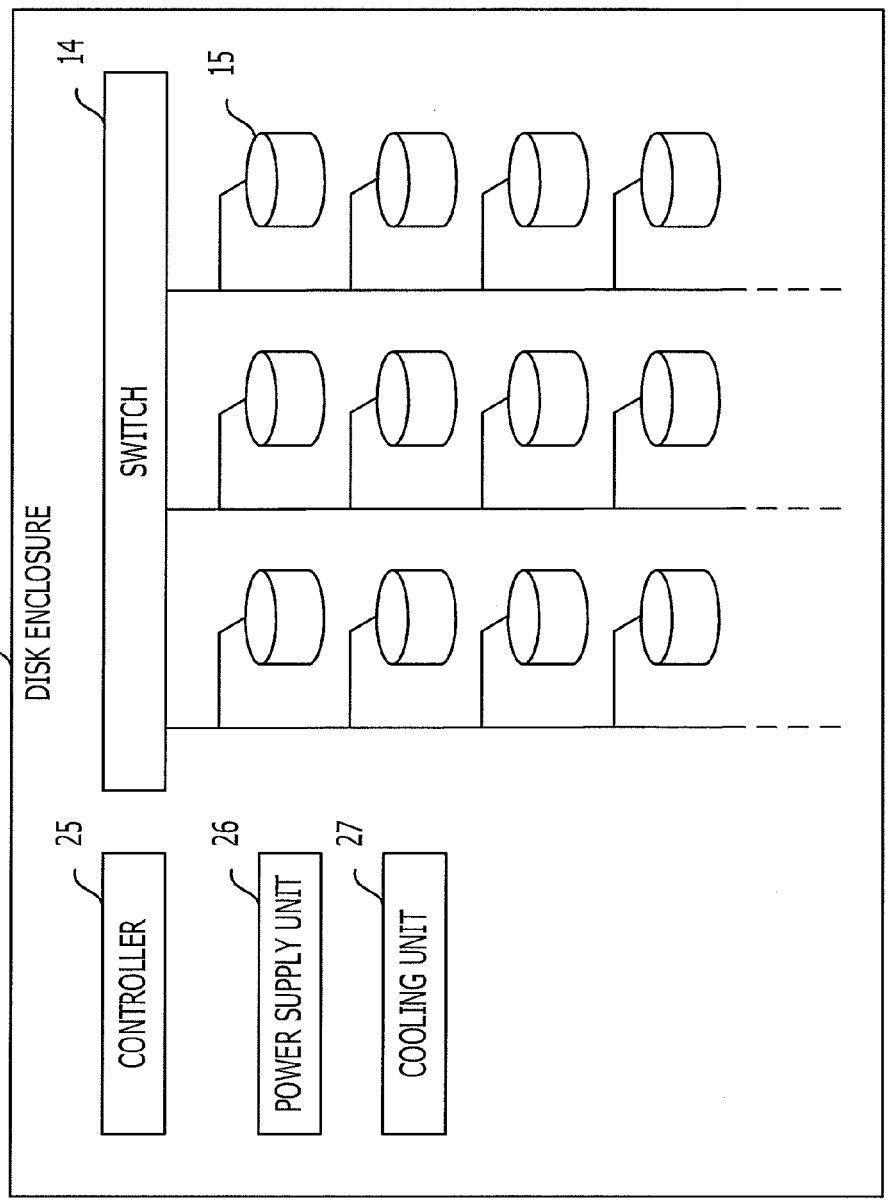
FIG. 3 is a diagram illustrating an exemplary configuration of a disk enclosure according to the second embodiment.

Next, a configuration of disk enclosures according to the second embodiment will be described with reference to FIG. 3. FIG. 3 illustrates an exemplary configuration of a disk enclosure according to the second embodiment.

A disk enclosure 13 includes a switch 14, a plurality of disks 15, a controller 25, a power supply unit 26, and a cooling unit 27. The switch 14 connects and disconnects the disks 15 with external devices. The cooling unit 27 cools the inside of the disk enclosure 13 including the disks 15 and the power supply unit 26. The power supply unit 26 supplies electrical power to the devices inside the disk enclosure 13 including the controller 25, the cooling unit 27, the switch 14, and the disks 15.

The controller 25 controls the devices inside the disk enclosure 13. The controller 25 monitors the states of the devices inside the disk enclosure 13 and detects failures of the devices inside the disk enclosure 13 or a failure of the entire disk enclosure 13. The controller 25 reports a detected failure to the resource manager 11.

Figure 4:
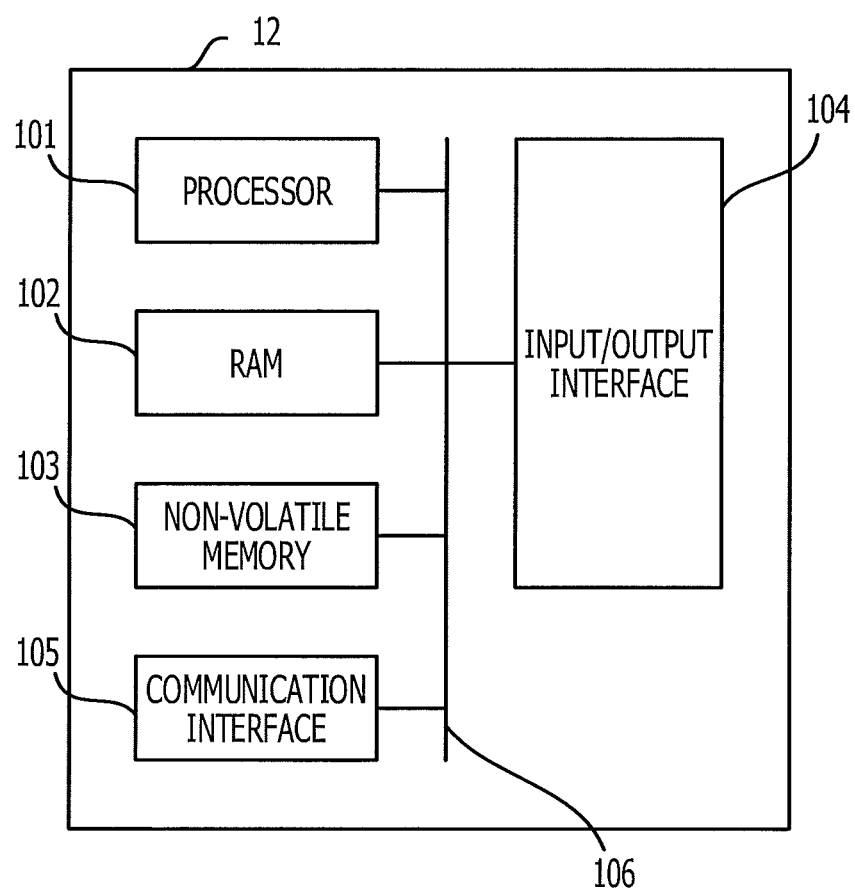
FIG. 4 is a diagram illustrating an exemplary hardware configuration of a server according to the second embodiment.

Next, a hardware configuration of a server according to the second embodiment will be described with reference to FIG. 4. FIG. 4 illustrates an exemplary hardware configuration of a server according to the second embodiment.

The entire server 12 is controlled by a processor 101. The processor 101 is connected to a random access memory (RAM) 102 and a plurality of peripheral devices via a bus 106. The processor 101 may be a multiprocessor. The processor 101 may be, for example, a central processing unit (CPU), a microprocessing unit (MPU), a digital signal processor (DSP), an application specific integrated circuit (ASIC), or a programmable logic device (PLD). The processor 101 may also be a combination of two or more elements among the CPU, the MPU, the DSP, the ASIC, and the PLD.

The RAM 102 is used as a main storage device in the server 12. At least a portion of programs of an operating system, firmware and application programs to be executed by the processor 101 are temporarily stored in the RAM 102. Various types of data (e.g., management information for system control) used for processing by the processor 101 are stored in the RAM 102. A cache memory separate from a memory used for storing the various types of data may be included in the RAM 102.

A non-volatile memory 103, an input/output interface 104, and a communication interface 105 and the like may be provided as the peripheral devices connected to the bus 106.

The non-volatile memory 103 holds stored contents even when the power of the server 12 is cut off. The non-volatile memory 103 may be, for example, a semiconductor storage device, such as an electrically erasable programmable read-only memory (EEPROM) and a flash memory, and an HDD. The non-volatile memory 103 is used as an auxiliary storage device in the server 12. Programs for the operating system, firmware, application programs, and various types of data are stored in the non-volatile memory 103.

The input/output interface 104 is connected to an input/output device (not illustrated) for conducting inputs and outputs.

The communication interface 105 is connected to a network forming the communication paths 16 and 18 and transmits and receives data to and from the resource manager 11 and the disk enclosures 13 via the communication paths 16 and 18.

The processing functions of the server 12 according to the second embodiment are achieved with the above hardware configuration. The resource manager 11 and controller 25 as well as the management device 2, the information processing apparatus 3, and the storage unit 4 according to the first embodiment may also be realized by hardware similar to that of the server 12 illustrated in FIG. 4.

The server 12 realizes the processing functions according to the second embodiment by executing programs stored, for example, in a computer-readable recording medium. The programs that include the processing contents to be executed by the server 12 may be previously stored in various recording media. For example, the programs executed by the server 12 may be previously stored in the non-volatile memory 103. The processor 101 loads at least a portion of the programs stored in the non-volatile memory 103 into the RAM 102 to execute the programs. The programs executed by the server 12 may also be previously recorded on a portable recording medium (not illustrated) such as an optical disk, a memory device, or a memory card and the like. The optical disk may include a digital versatile disc (DVD), a DVD-RAM, a compact disc read-only memory (CD-ROM), or a recordable/rewritable CD (CD-R/RW). The memory device is a recording device with a built-in communication device that communicates with the input/output interface 104 or a device connection interface (not illustrated). For example, the memory device is able to write data onto a memory card or read data from the memory card with a memory reader/writer. The memory card is a card-type recording medium.

Programs stored in the portable recording medium may be executable after being installed in the non-volatile memory 103 based on control by, for example, the processor 101. The processor 101 may read and execute the programs directly from the portable recording medium.

Figure 5:
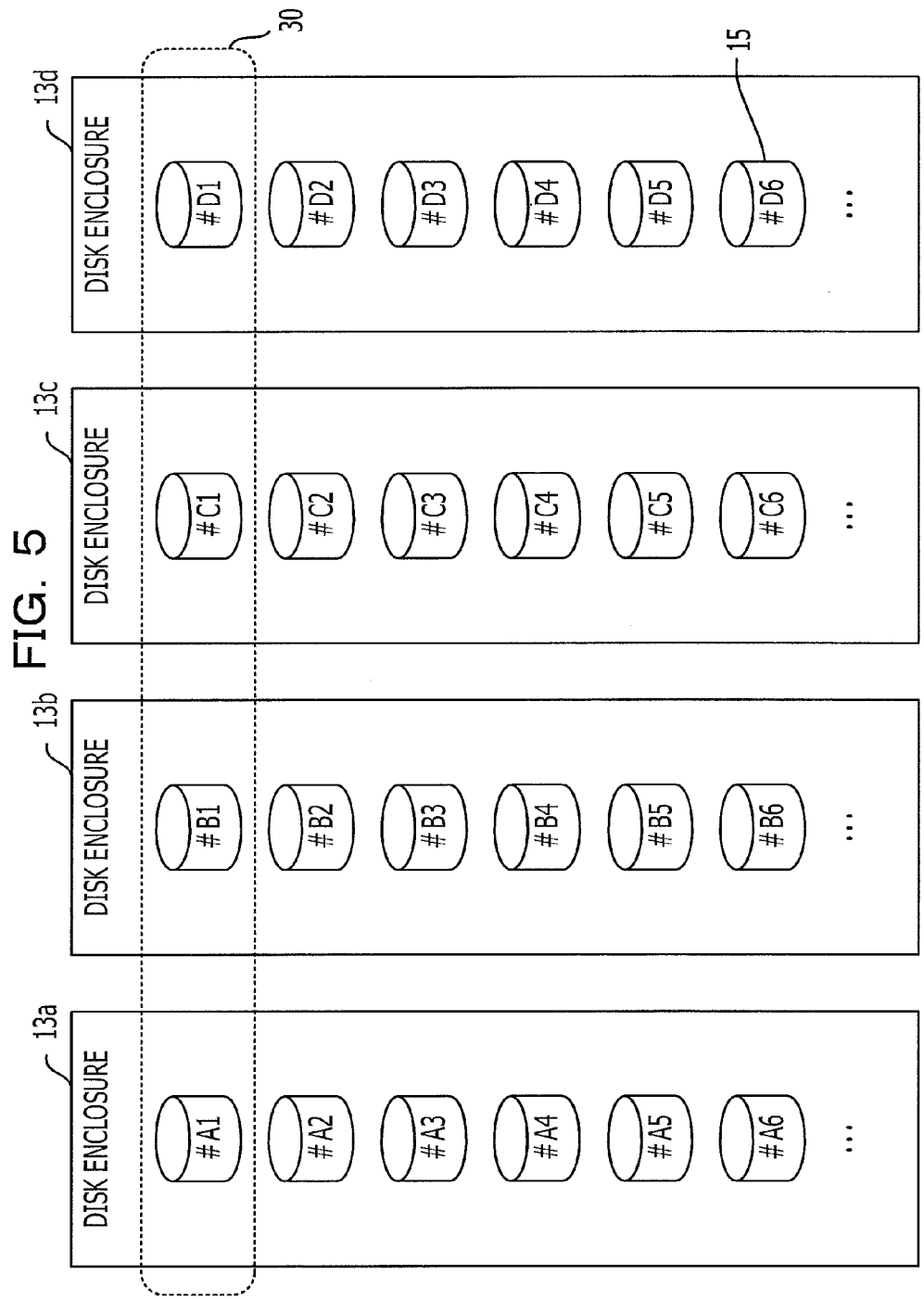
FIG. 5 is a diagram illustrating an example of a RAID group configured by a server according to the second embodiment.

Next, a RAID group configured by a server according to the second embodiment will be described with reference to FIG. 5. FIG. 5 illustrates an example of a RAID group configured by a server according to the second embodiment.

A disk enclosure 13a contains a plurality of disks 15 ("#A1", "#A2", "#A3", "#A4" . . . ). A disk enclosure 13b contains a plurality of disks 15 ("#B1", "#B2", "#B3", "#B4" . . . ). A disk enclosure 13c contains a plurality of disks 15 ("#C1", "#C2", "#C3", "#C4" . . . ). A disk enclosure 13d contains a plurality of disks 15 ("#D1", "#D2", "#D3", "#D4" . . . ).

The server 12 (e.g., the server 12a) receives allocation of the disks 15 ("#A1", "#B1", "#C1", "#D1") from the respective disk enclosures 13a, 13b, 13c, and 13d, and configures a RAID group 30 (e.g., a RAID-5).

The RAID group 30 includes the disks 15 ("#A1", "#B1", "#C1", "#D1") that each contained in different disk enclosures 13. As a result, even if one of the four disk enclosures 13 fails, the failure is limited to only one of the disks 15 for the server 12. Therefore, the server 12 is able to access the data in the RAID group 30 and is able to reconfigure the RAID group 30.

Next, RAID configuration information managed by a server according to the second embodiment will be described with reference to FIG. 6. FIG. 6 illustrates an example of RAID configuration information according to the second embodiment.

RAID configuration information is information that indicates the configuration of a RAID group managed by the server 12 (e.g., the server 12a). The server 12 stores the RAID configuration information in, for example, the non-volatile memory 103. The RAID configuration information includes a RAID group identifier (ID), a block number (No.), a status, a disk enclosure ID, and a disk ID.

The RAID group ID is information for identifying the RAID group 30 managed by the server 12. The RAID group IDs indicated in the RAID configuration information 50 illustrated in FIG. 6 are all "#0001", therefore the information in the RAID configuration information 50 indicates information regarding the disks 15 included in the same RAID group.

The block number is a serial number assigned to the respective disks 15 included in the RAID group 30. The status indicates a state of each disk 15 included in the RAID group 30. The normal state is "physical". The disk enclosure ID is identification information that is able to uniquely identify each disk enclosure 13 within the storage system 10. The disk ID is identification information that is able to uniquely identify each disk 15 within each disk enclosure 13. Therefore, the server 12 is able to uniquely identify the disks 15 in the storage system 10 based on the disk enclosure ID and the disk ID.

Thus, the RAID configuration information 50 indicates that the RAID group 30 with the RAID group ID "#0001" is configured with four disks 15 of block numbers "1", "2", "3", and "4". The RAID configuration information 50 indicates, by the status of "physical", that a normal RAID group is configured. The RAID configuration information 50 indicates that the disk 15 of the block number "1" has the disk ID "#1" with the disk enclosure ID "#A". Similarly, the RAID configuration information 50 indicates that the disk 15 of the block number "2" has the disk ID "#1" with the disk enclosure ID "#B". Similarly, the RAID configuration information 50 indicates that the disk 15 of the block number "3" has the disk ID "#1" with the disk enclosure ID "#C". Similarly, the RAID configuration information 50 indicates that the disk 15 of the block number "4" has the disk ID "#1" with the disk enclosure ID "#D".

Figure 7:
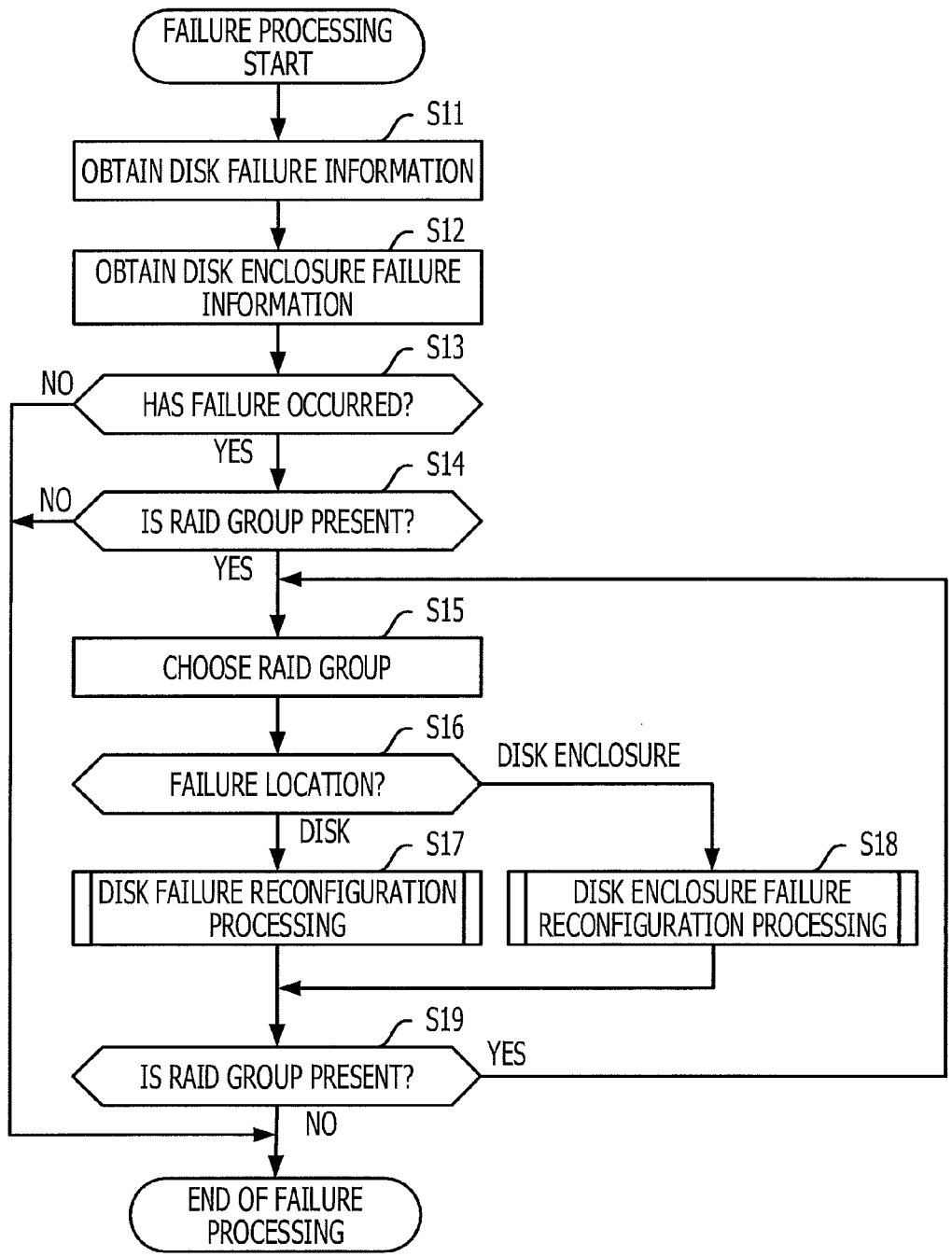
FIG. 7 is a flow chart of failure processing according to the second embodiment.

Next, failure processing according to the second embodiment will be described with reference to FIG. 7. FIG. 7 is a flow chart of failure processing according to the second embodiment.

The failure processing involves detecting a storage resource failure and reconfiguring the RAID. The failure processing is executed regularly by the server 12.

(S11) The processor 101 (control unit) in the server 12 obtains disk failure information. The disk failure information relates to the failure of a disk 15 that is allocated to the server 12. The processor 101 detects the failure of the disk 15 by regularly or irregularly monitoring the operation states of the disks 15 via the communication path 18 to generate the disk failure information. The processor 101 is able to monitor the operation states of the disks 15 based on polling of the disks 15 or based on reports from the disks 15.

(S12) The control unit obtains disk enclosure failure information. The disk enclosure failure information relates to a failure of a disk enclosure 13 managed by the resource manager 11. The resource manager 11 detects failures of the disk enclosures 13 based on regularly or irregularly monitoring the operation states of the disk enclosures 13 via the communication path 17 to generate the disk enclosure failure information. The resource manager 11 is able to monitor the operation states of the disk enclosures 13 based on polling of the disk enclosures 13 or based on reports from the disk enclosures 13. The resource manager 11 may generate the disk failure information based on a disk failure detected via the disk enclosure 13 and then report the disk failure information to the server 12.

(S13) The control unit determines whether a failure of a disk 15 has occurred based on the disk failure information and the disk enclosure failure information. The control unit advances to S14 if it is determined that a failure of a disk 15 has occurred, or ends the failure processing if it is determined that no failure of a disk 15 has occurred.

(S14) The control unit refers to the RAID configuration information to determine whether a RAID group related to the failed disk 15 is present. The control unit advances to S15 if a RAID group related to the failed disk 15 is present, or ends the failure processing if no RAID group related to the failed disk 15 is present.

(S15) The control unit chooses one RAID group that includes the failed disk 15.

(S16) The control unit determines whether the failure location is a disk 15 or a disk enclosure 13. The control unit advances to S17 if the failure location is a disk 15 and advances to S18 if the failure location is a disk enclosure 13.

(S17) The control unit executes disk failure reconfiguration processing. The disk failure reconfiguration processing involves reconfiguring the RAID if a disk 15 has failed. The disk failure reconfiguration processing will be described later in detail with reference to FIG. 8.

(S18) The control unit executes disk enclosure failure reconfiguration. The disk enclosure failure reconfiguration processing involves reconfiguring the RAID if a disk enclosure 13 has failed. The disk enclosure failure reconfiguration processing will be described later in detail with reference to FIG. 9.

(S19) The control unit determines whether another RAID group that is related to the failed disk 15 and is not yet chosen in S15 is present, that is, another RAID group to be reconfigured. The control unit advances to S15 if it is determined that another RAID group to be reconfigured is present, or ends the failure processing if it is determined that no RAID group to be reconfigured is present.

Figure 8:
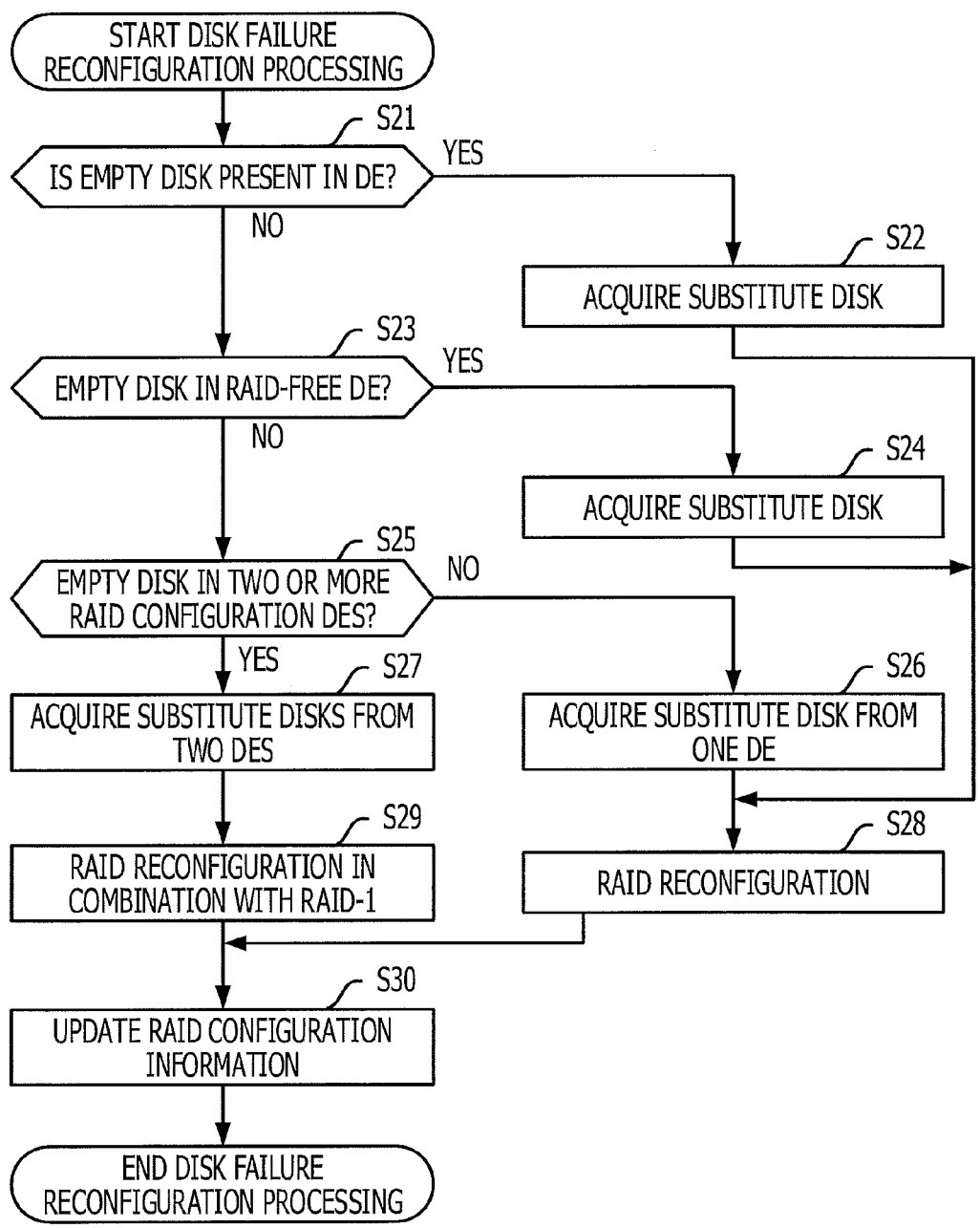
FIG. 8 is a flow chart of disk failure reconfiguration processing according to the second embodiment.

Next, the disk failure reconfiguration processing according to the second embodiment will be described with reference to FIG. 8. FIG. 8 is a flow chart of the disk failure reconfiguration processing according to the second embodiment. The disk failure reconfiguration processing is executed by the server 12 in S17 of the failure processing.

(S21) The processor 101 (control unit) in the server 12 determines whether an empty disk is present in the disk enclosure 13 (DE) of the failed disk, that is, the DE that contains the failed disk 15. The control unit is able to determine whether an empty disk is present in the DE of the failed disk by referring to the resource manager 11. The control unit advances to S22 if an empty disk is present in the DE of the failed disk, and advances to S23 if no empty disk is present in the DE of the failed disk.

(S22) The control unit receives allocation of a disk 15 from the disk enclosure 13 that contains the failed disk to acquire a substitute disk.

(S23) The control unit determines whether an empty disk is present in a RAID-free DE, that is, a DE that does not contain a disk included in the RAID group. The control unit is able to determine whether an empty disk is present in a RAID-free DE by referring to the resource manager 11. The control unit advances to S24 if an empty disk is present, and advances to S25 if no empty disk is present.

(S24) The control unit acquires a substitute disk from the RAID-free DE.

(S25) The control unit determines whether an empty disk is present in each of two or more RAID configuration DEs, that is, DEs that contain disks included in the RAID group. The control unit is able to determine whether an empty disk is present in each of two or more RAID configuration DEs by referring to the resource manager 11. The control unit advances to S26 if an empty disk is not present in each of two or more RAID configuration DEs, and advances to S27 if an empty disk is present in each of two or more RAID configuration DEs.

(S26) The control unit receives allocation of a disk 15 from one RAID configuration DE to acquire a substitute disk.

(S27) The control unit receives allocation of one disk 15 from each of two DEs among the two or more RAID configuration DEs to acquire two substitute disks.

(S28) The control unit reconfigures (first rebuild processing) the RAID including the acquired substitute disk. At this time, the RAID group that is reconfigured with the substitute disk acquired in S22 or S24 includes disks each contained in different disk enclosures 13. Conversely, the RAID group that is reconfigured with the substitute disk acquired in S26 includes disks contained in the same disk enclosure 13. As a result, this RAID group may suffer from data loss if the same disk enclosure 13 fails.

(S29) The control unit conducts a RAID reconfiguration (second rebuild processing) in combination with RAID-1 including the acquired substitute disks. The RAID group that is reconfigured with the substitute disks acquired in S27 includes disks contained in the same disk enclosures 13. The control unit reconfigures the RAID group so that the two substitute disks replicate each other. The reconfiguration of the RAID group will be described later using an example with reference to FIG. 10 to FIG. 12.

(S30) The control unit updates the RAID configuration information and ends the disk failure reconfiguration processing.

Figure 9:
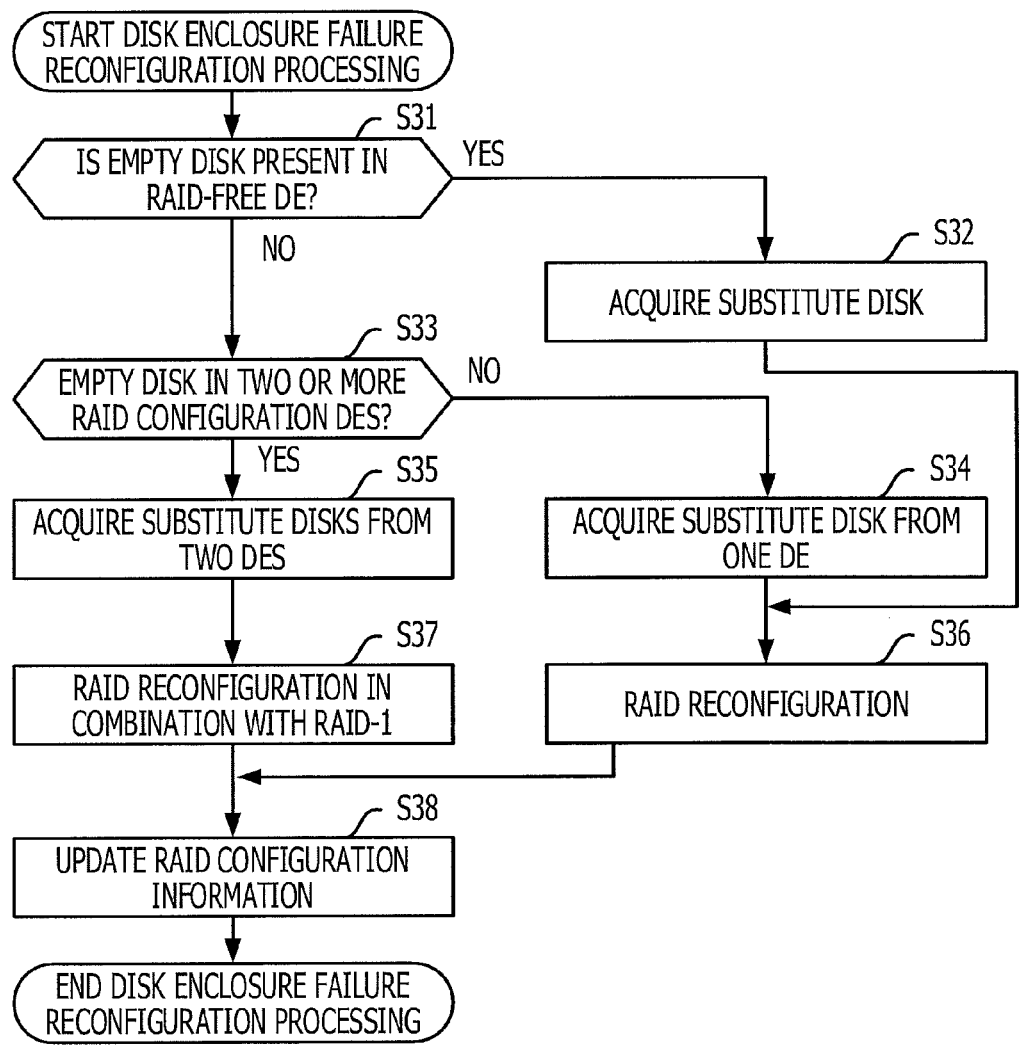
FIG. 9 is a flow chart of disk enclosure failure reconfiguration processing according to the second embodiment.

Next, the disk enclosure failure reconfiguration processing according to the second embodiment will be described with reference to FIG. 9. FIG. 9 is a flow chart of disk enclosure failure reconfiguration processing according to the second embodiment. The disk enclosure failure reconfiguration processing is executed by the server 12 in S18 of the failure processing.

(S31) The processor 101 (control unit) in the server 12 determines whether an empty disk is present in a RAID-free DE, that is, a DE that does not contain a disk included in the RAID group. The control unit is able to determine whether an empty disk is present in a RAID-free DE by referring to the resource manager 11. The control unit advances to S32 if an empty disk is present, and advances to S33 if no empty disk is present.

(S32) The control unit acquires a substitute disk from the RAID-free DE.

(S33) The control unit determines whether an empty disk is present in two or more disk enclosures 13 of the RAID configuration, that is, DEs that contain disks included in the RAID group. The control unit is able to determine whether an empty disk is present in each of two or more RAID configuration DEs by referring to the resource manager 11. The control unit advances to S34 if an empty disk is not present in each of two or more RAID configuration DEs, and advances to S35 if an empty disk is present in each of two or more RAID configuration DEs.

(S34) The control unit receives allocation of a disk 15 from one RAID configuration DE to acquire a substitute disk.

(S35) The control unit receives allocation of one disk 15 from each of two DEs among the two or more RAID configuration DEs to acquire two substitute disks.

(S36) The control unit reconfigures (first rebuild processing) the RAID including the acquired substitute disk. At this time, the RAID group that is reconfigured with the substitute disk acquired in S32 includes disks each contained in different disk enclosures 13. Conversely, the RAID group that is reconfigured with the substitute disk acquired in S34 includes disks contained in the same disk enclosure 13. As a result, this RAID group may suffer from data loss if the same disk enclosure 13 fails.

(S37) The control unit conducts a RAID reconfiguration (second rebuild processing) in combination with RAID-1 including the acquired substitute disks. The RAID group that is reconfigured with the substitute disks acquired in S35 includes disks contained in the same disk enclosures 13. The control unit reconfigures the RAID group so that the two substitute disks replicate each other. The reconfiguration of the RAID group will be described later using an example with reference to FIG. 10 to FIG. 12.

(S38) The control unit updates the RAID configuration information and ends the disk enclosure failure reconfiguration processing.

Figure 10:
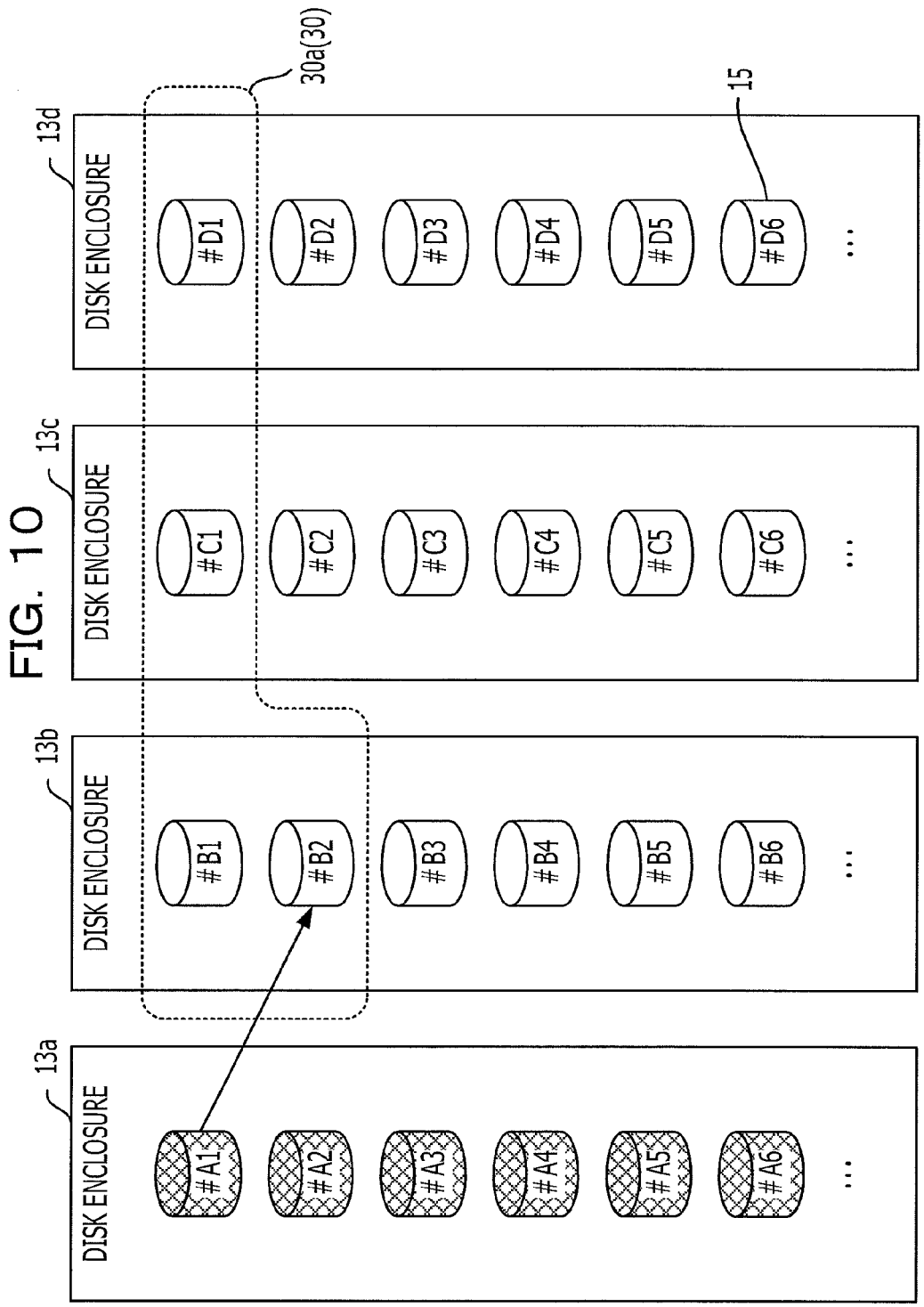
FIG. 10 is a diagram illustrating an example of a RAID group configured by a server according to the second embodiment.

Next, a RAID reconfiguration when a substitute disk is acquired from a RAID configuration DE according to the second embodiment will be described with reference to FIG. 10 to FIG. 12. First, a case in which a failure of one of the RAID configuration DEs occurs and a substitute disk is to be acquired from another RAID configuration DE will be described with reference to FIG. 10. FIG. 10 is an example of a RAID group configured by a server according to the second embodiment.

A disk enclosure 13a fails and a plurality of disks 15 ("#A1", "#A2", "#A3" . . . ) fail due to the failure of the disk enclosure 13a. The control unit receives allocation of a disk 15 from another disk enclosure 13 for substitution with the disk 15 "#A1" based on the failure detection of the disk enclosure 13a. For example, the control unit receives allocation of the disk 15 "#B2" from the disk enclosure 13b in the case of S26 in the disk failure reconfiguration processing or in the case of S34 in the disk enclosure failure reconfiguration processing.

The control unit includes the disk 15 "#B2" contained in the disk enclosure 13b in place of the disk 15 "#A1" contained in the disk enclosure 13a to reconfigure the RAID group 30 as a RAID group 30a.

That is, the control unit receives allocation of the disks 15 ("#B2", "#B1", "#C1", "#D1") from the disk enclosures 13b, 13c, and 13d, and reconfigures the RAID group 30 as the RAID group 30a.

The RAID group 30a includes disks 15 ("#B2" and "#B1") contained in the same disk enclosure 13b. As a result, the server 12 enters a state in which there may be data loss due to a failure of the disk enclosure 13b. Therefore, when the RAID reconfiguration is conducted in S26 of the disk failure reconfiguration processing or in S34 of the disk enclosure failure reconfiguration processing, the server 12 may suffer from data loss if the disk enclosure 13b fails.

Conversely, the server 12 is able to conduct a RAID reconfiguration without the risk of data loss when two substitute disks are acquired from two different DEs of a RAID configuration. A case in which two substitute disks are acquired from two different DEs of a RAID configuration will be described with reference to FIG. 11. FIG. 11 is an example of a RAID group configured by a server according to the second embodiment. For example, the control unit receives allocation of the disk 15 "#C2" from the disk enclosure 13c in addition to the disk 15 "#B2" in the case of S27 in the disk failure reconfiguration processing or in the case of S35 in the disk enclosure failure reconfiguration processing.

The control unit replicates the disk 15 "#B2" into the disk 15 "#C2" when the control unit receives allocation of the disk 15 "#C2" from the disk enclosure 13c in addition to the disk 15 "#B2". That is, the control unit configures RAID-1 with the disk 15 "#B2" and the disk 15 "#C2". In other words, the control unit replaces the disk 15 "#A1" contained in the disk enclosure 13a with the disk 15 "#B2" and the disk 15 "#C2".

Consequently, the control unit receives allocation of the disks 15 ("#B2", "#C2", "#B1", "#C1", "#D1") from the disk enclosures 13b, 13c, and 13d, and reconfigures the RAID group 30 as a RAID group 30b in combination with RAID-1.

The RAID group 30b includes disks 15 ("#B2" and "#B1") contained in the same disk enclosure 13b, and includes disks 15 ("#C2" and "#C1") contained in the same disk enclosure 13c. However, the server 12 is able to access the RAID group 30 even if either one of the disk enclosures 13b and 13c fails.

Therefore, the storage system 10 is able to reduce data loss due to the failure of a disk enclosure 13 (in units of storage units). The storage system 10 is also able to improve reliability and use the storage resources in an efficient manner during normal operation since the replication of disks 15 does not have to be conducted.

When a RAID reconfiguration is conducted without the combined use of RAID-1, there is a risk that data loss may occur when a disk enclosure 13 containing two disks 15 fails. When a disk failure rate is represented as $f_{hdd}$ and a disk enclosure failure rate is represented as $f_{de}$, the failure rate is obtained from the expression $f_{hdd} \times (f_{hdd} + f_{de})$.

Conversely, when a RAID reconfiguration is conducted with the combined use of RAID-1, there is no risk that data loss may occur when a disk enclosure 13 containing two disks 15 fails. The failure rate in this case is $f_{hdd} \times f_{hdd}$ which results is a lower failure rate than a case in which RAID reconfiguration is conducted without the combined use of RAID-1.

Next, RAID configuration information after a RAID reconfiguration in combination with RAID-1 is conducted in the second embodiment will be described with reference to FIG. 12. FIG. 12 is an example of RAID configuration information according to the second embodiment.

RAID configuration information 51 illustrated in FIG. 12 represents information when the RAID configuration information 50 illustrated in FIG. 6 is updated after the RAID reconfiguration in combination with RAID-1 is conducted.

The RAID configuration information 51 indicates that a RAID group 30 with the RAID group ID "0001" is configured by five disks 15. A block number "1" is assigned to two of the five disks 15. Block numbers "2", "3", and "4" are assigned to the other three disks 15, respectively. The RAID configuration information 51 indicates, by the status "RAID-1", that the two disks of the block number "1" configure RAID-1. The status "RAID-1" indicates that the disk 15 has replication. That is, the status "RAID-1" corresponds to replication distinction information for distinguishing whether a disk 15 is replicated.

The RAID configuration information 51 indicates that one disk 15 of the block number "1" is a disk 15 of the disk ID "#2" contained in a DE of the disk enclosure ID "#B". The RAID configuration information 51 indicates that another disk 15 of the block number "1" is a disk 15 of the disk ID "#2" contained in a DE of the disk enclosure ID "#C". Similarly, the RAID configuration information 51 indicates that the disk 15 of the block number "2" is a disk 15 of the disk ID "#1" contained in a DE of the disk enclosure ID "#B". Similarly, the RAID configuration information 51 indicates that the disk 15 of the block number "3" is a disk 15 of the disk ID "#1" contained in a DE of the disk enclosure ID "#C". Similarly, the RAID configuration information 51 indicates that the disk 15 of the block number "4" is a disk 15 of the disk ID "#1" contained in a DE of the disk enclosure ID "#D".

Figure 13:
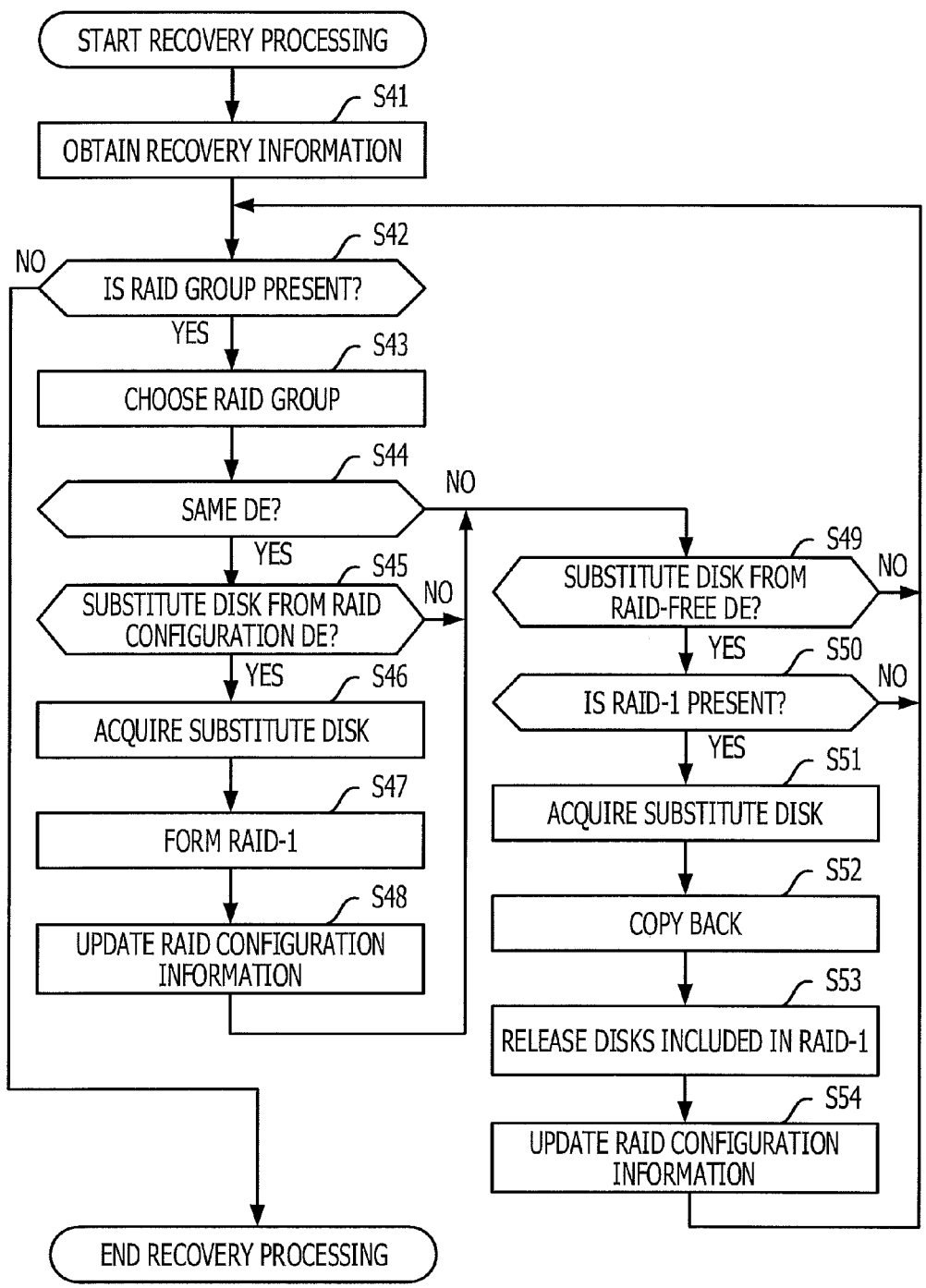
FIG. 13 is a flow chart of recovery processing according to the second embodiment.

Next, recovery processing according to the second embodiment will be described with reference to FIG. 13. FIG. 13 is a flow chart of recovery processing according to the second embodiment. The recovery processing is executed by the server 12 upon completion of maintenance of storage resources. The maintenance involves replacement of failed disks 15 and failed disk enclosures 13. For example, the recovery processing may be conducted in accordance with an instruction from an administrator, or may be conducted periodically.

(S41) The processor 101 (control unit) in the server 12 obtains recovery information. The recovery information relates to the failure of a disk 15 allocated to the server 12 or to the failure of disk enclosure 13 that contains a disk 15 allocated to the server 12. The processor 101 detects a recovery of a disk 15 by regularly or irregularly monitoring the operation states of the disks 15 via the communication path 18 to generate recovery information (disk recovery information) relating to the disk 15. The resource manager 11 detects a recovery of a disk enclosure 13 by regularly or irregularly monitoring the operation states of the disk enclosures 13 via the communication path 17 to generate the recovery information (disk enclosure recovery information) relating to the disk enclosures 13. The resource manager 11 may generate the disk recovery information based on recovery of a disk 15 detected via the disk enclosure 13 and then report the disk recovery information to the server 12. While a recovery in this case is the replacement of a failed disk 15 or a failed disk enclosure 13, a recovery may also include the addition of a disk 15 or a disk enclosure 13 from the point of view of a transition toward a state of being able to allocate disks 15.

(S42) The control unit determines whether a RAID group to which a recovered disk 15 is to be allocated is present. The control unit advances to S43 if a RAID group to which a recovered disk 15 is to be allocated is present, or ends the recovery processing if no RAID group to which a recovered disk 15 is to be allocated is present.

(S43) The control unit chooses one RAID group to which a recovered disk 15 is to be allocated.

(S44) The control unit determines whether disks (RAID configuration disks) included in the RAID group and contained in one disk enclosure 13 (same DE) are present. The control unit advances to S45 if RAID configuration disks contained in the same DE are present, and advances to S49 if no RAID configuration disks contained in the same DE are present.

(S45) The control unit determines whether it is possible to acquire a substitute disk from a disk enclosure 13 (RAID configuration DE) that contains a disk 15 included in the RAID group based on the recovery information and the RAID configuration information. The control unit advances to S46 if a substitute disk is able to be acquired from a RAID configuration DE, and advances to S49 if no substitute disk is able to be acquired from a RAID configuration DE.

(S46) The control unit acquires the substitute disk.

(S47) The control unit forms RAID-1 with the substitute disk and one of the RAID configuration disks contained in the same DE.

(S48) The control unit updates the RAID configuration information and advances to S49.

(S49) The control unit determines whether it is possible to acquire a substitute disk from a disk enclosure 13 (RAID-free DE) that does not contain a disk 15 included in the RAID group based on the recovery information and the RAID configuration information. The control unit advances to S50 if the acquisition of a substitute disk is possible from a RAID-free DE, and advances to S42 if the acquisition of a substitute disk is not possible from a RAID-free DE.

(S50) The control unit refers to the status in the RAID configuration information to determine whether RAID-1 is present in the RAID group. The control unit advances to S51 if RAID-1 is present in the RAID group, and advances to S42 if RAID-1 is not present in the RAID group.

(S51) The control unit acquires the substitute disk from a RAID-free DE.

(S52) The control unit conducts copy back processing from one of the disks 15 included in RAID-1 to the substitute disk.

(S53) The control unit releases the disks 15 included in RAID-1.

(S54) The control unit updates the RAID configuration information and advances to S42.

Figure 14:
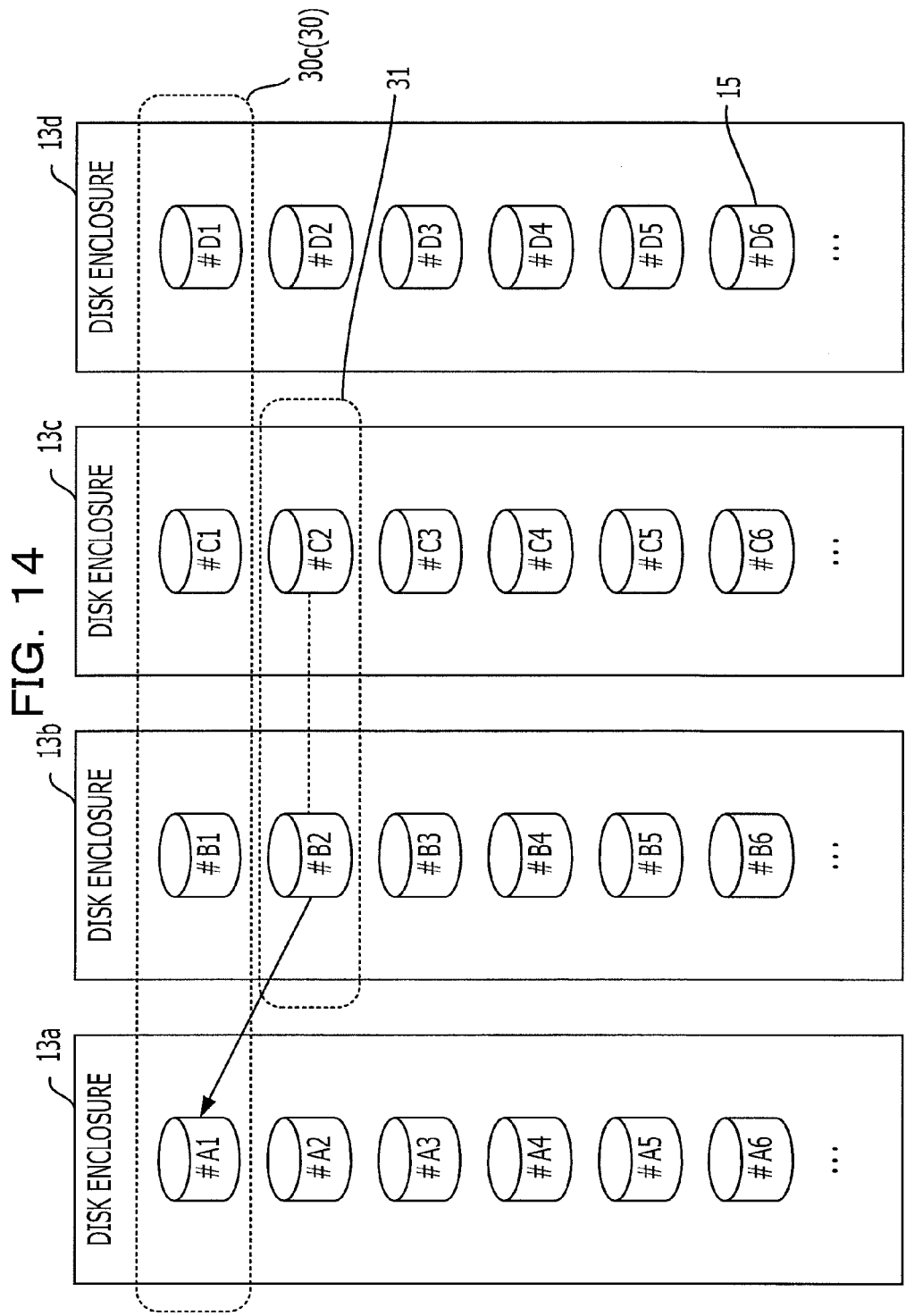
FIG. 14 is a diagram illustrating an example of a RAID group configured by a server according to the second embodiment.

The copy back to the acquired disk and the release of the disks 15 included in RAID-1 will be described with reference to FIG. 14. FIG. 14 is an example of a RAID group configured by a server according to the second embodiment.

Figure 11:
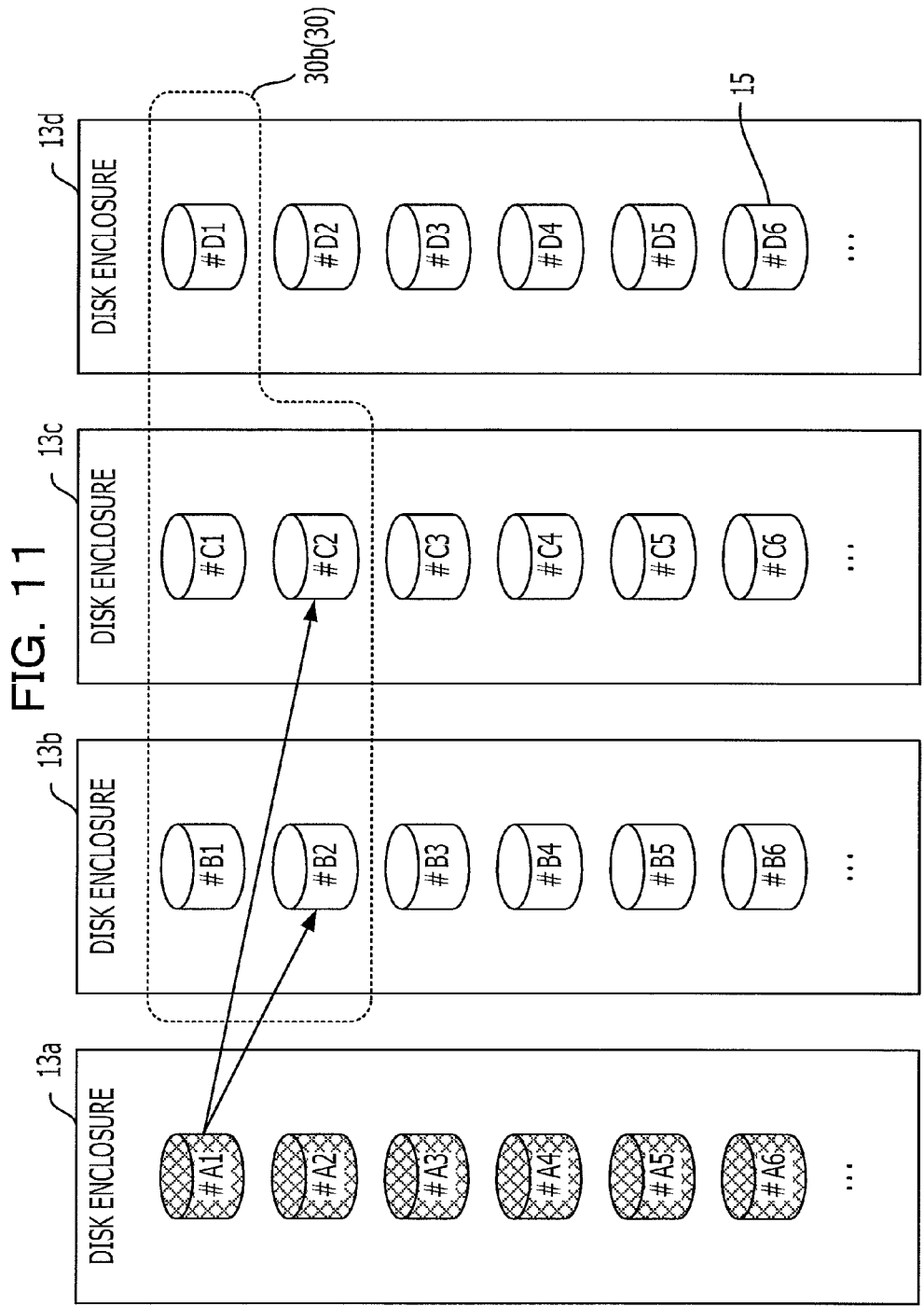
FIG. 11 is a diagram illustrating an example of a RAID group configured by a server according to the second embodiment.

The RAID group 30b illustrated in FIG. 11 is configured in combination with RAID-1 due to a failure of the disk enclosure 13a. When the disk enclosure 13a is recovered as illustrated in FIG. 14, the control unit acquires a disk 15 (e.g., the disk 15 "#A1") contained in the disk enclosure 13a. The control unit conducts copy back processing from the disk 15 "#B2" included in RAID-1 to the disk 15 "#A1". As a result, the server 12 is able to reconfigure a RAID group 30c. The control unit sends a release request to the resource manager 11 for releasing the disks 15 "#B2" and "#C2" included in RAID-1 as release objects 31, and the allocation of the disks 15 "#B2" and "#C2" to the server 12 is released.

Therefore, due to the recovery of a disk enclosure 13 (in units of storage units), the storage system 10 is able to recover a RAID group from a state involving RAID-1.

Third Embodiment

Figure 15:
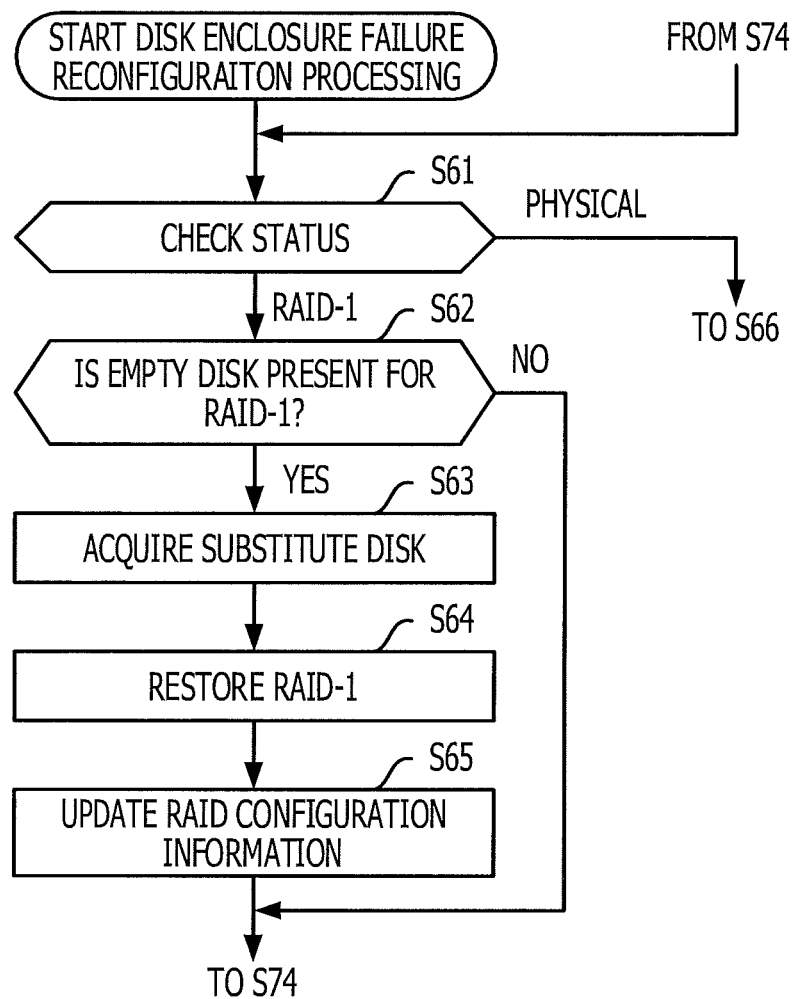
FIG. 15 is a flow chart of disk enclosure failure reconfiguration processing according to a third embodiment.
Figure 16:
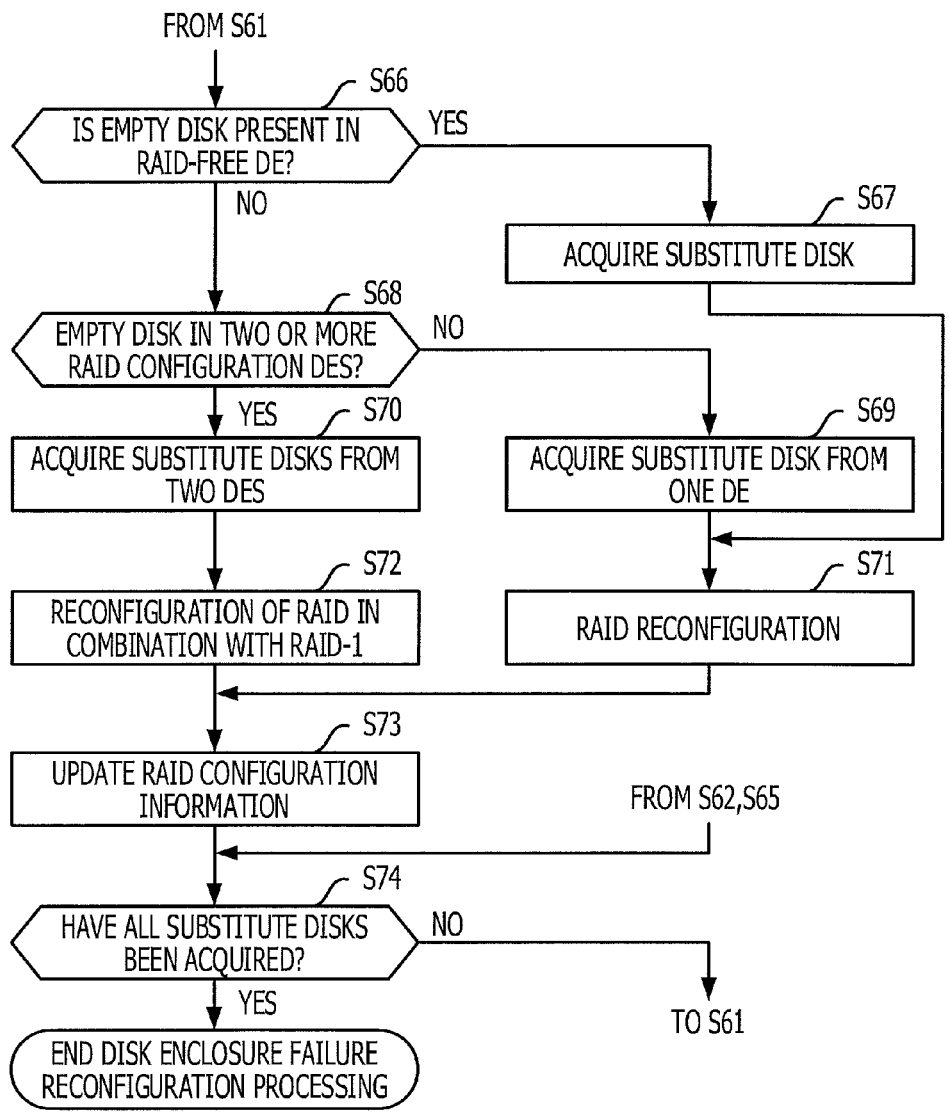
FIG. 16 is a flow chart of disk enclosure failure reconfiguration processing according to the third embodiment.

Next, disk enclosure failure reconfiguration processing according to a third embodiment will be described with reference to FIG. 15 and FIG. 16. FIG. 15 and FIG. 16 represent a flow chart of disk enclosure failure reconfiguration processing according to the third embodiment. The disk enclosure failure reconfiguration processing of the third embodiment is to address the failure of a disk enclosure 13 that contains a disk 15 included in a RAID group in combination with RAID-1.

(S61) The processor 101 (control unit) of the server 12 checks the status of the failed disk. The control unit advances to S66 if the status of the failed disk is "physical" and advances to S62 if the status of the failed disk is "RAID-1".

(S62) The control unit determines whether an empty disk is present in a disk enclosure 13 (DE), which is able to restore RAID-1, among the RAID configuration DEs. The disk enclosure 13 that is able to restore RAID-1 is a disk enclosure 13 that is different from the disk enclosures 13 that contains a disk 15 with the status "RAID-1". The control unit advances to S63 if an empty disk is present in a RAID configuration DE that is able to restore RAID-1, and advances to S74 if no empty disk is present in a RAID configuration DE that is able to restore RAID-1.

(S63) The control unit acquires a substitute disk from the RAID configuration DE that is able to restore RAID-1.

(S64) The control unit restores RAID-1 with the substitute disk in place of the failed disk.

(S65) The control unit updates the RAID configuration information and advances to S74.

(S66) The control unit determines whether an empty disk is present in a RAID-free DE. The control unit advances to S67 if an empty disk is present in a RAID-free DE, and advances to S68 if no empty disk is present in a RAID-free DE.

(S67) The control unit acquires a substitute disk from the RAID-free DE.

(S68) The control unit determines whether an empty disk is present in each of two or more RAID configuration DEs. The control unit advances to S69 if an empty disk is not present in each of two or more RAID configuration DEs, and advances to S70 if an empty disk is present in each of two or more RAID configuration DEs.

(S69) The control unit receives allocation of a disk 15 from one RAID configuration DE to acquire a substitute disk.

(S70) The control unit receives allocation of one disk 15 each from two DEs among the two or more RAID configuration DEs to acquire two substitute disks.

(S71) The control unit conducts a RAID reconfiguration (first rebuild processing) involving the acquired substitute disk. At this time, the RAID group included in the RAID reconfiguration involving the substitute disk acquired in S67 includes disks each contained in different disk enclosures 13. Conversely, the RAID group included in the RAID reconfiguration involving the substitute disk acquired in S69 partially includes disks contained in the same disk enclosure 13. As a result, this RAID group may suffer from data loss if the same disk enclosure 13 fails.

(S72) The control unit conducts a RAID reconfiguration (second rebuild processing) in combination with RAID-1 including the acquired substitute disks. The RAID group included in the RAID reconfiguration involving the substitute disks acquired in S70 includes disks contained in the same disk enclosure 13. The control unit reconfigures the RAID group so that the two substitute disks replicate each other.

(S73) The control unit updates the RAID configuration information.

(S74) The control unit determines whether substitute disks have been acquired for all of the failed disks. The control unit advances to S61 if substitute disks for some of the failed disks have not been acquired, and ends the disk enclosure failure reconfiguration processing if substitute disks for all of the failed disks have been acquired.

As a result, the control unit is able to reconfigure a RAID group in combination with RAID-1 even if the status of the failed disk is "RAID-1". Therefore, the storage system 10 is able to reduce data loss even if a repeated failure of disk enclosures 13 (in units of storage units) occurs. The storage system 10 is also able to improve reliability and use the storage resources in an efficient manner during normal operation since the replication of disks 15 does not have to be conducted.

Figure 17:
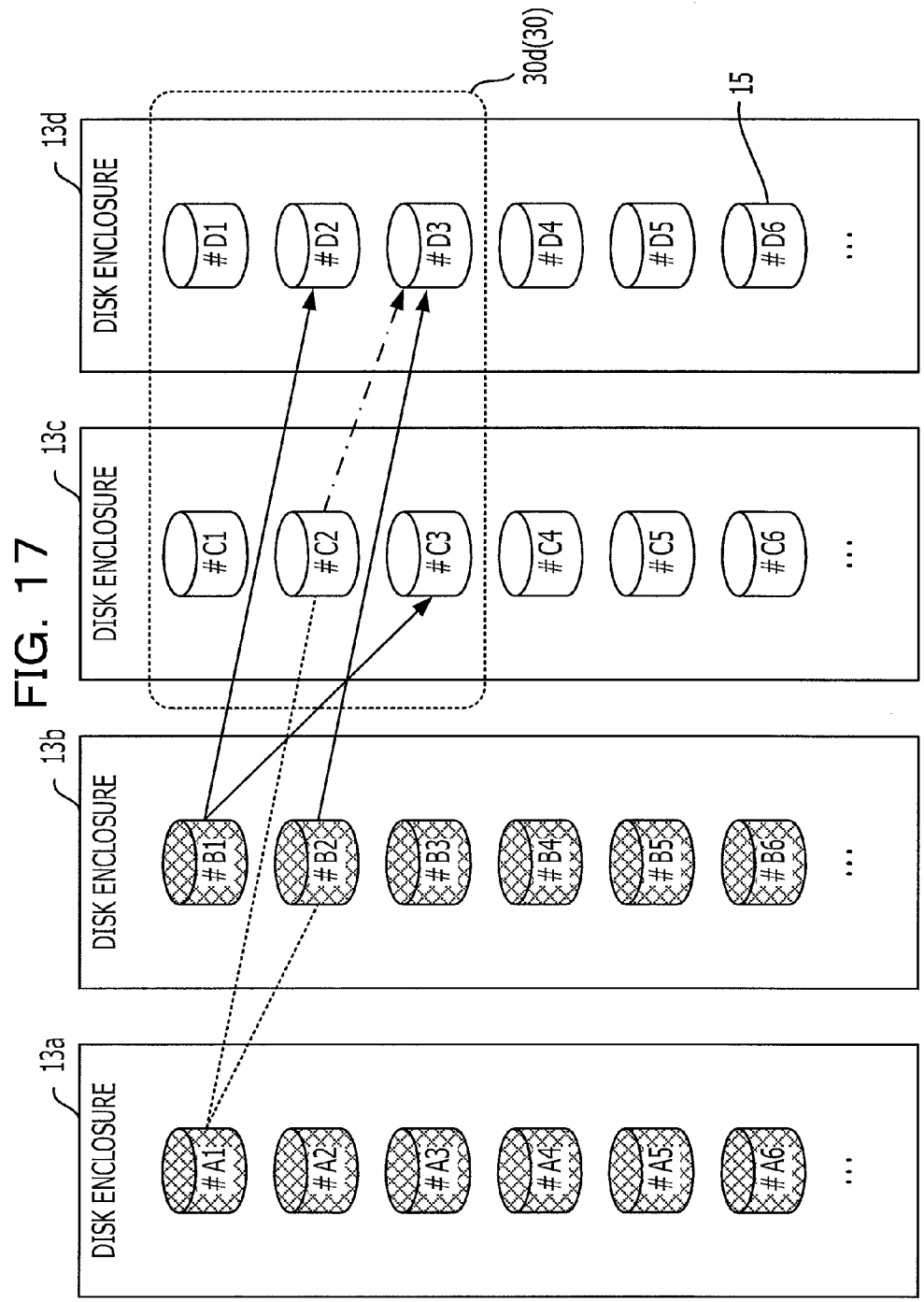
FIG. 17 is a diagram illustrating an example of a RAID group configured by a server according to the third embodiment.

Next, a RAID reconfiguration when a substitute disk is acquired from a RAID configuration DE according to the third embodiment will be described with reference to FIG. 17 to FIG. 18. First, a case, in which one more RAID configuration DE fails in addition to the state of the RAID group 30b illustrated in FIG. 11 in which one of the RAID configuration DEs fails and a substitute disk is acquired from another RAID configuration DE, will be described with reference to FIG. 17. FIG. 17 is an example of a RAID group configured by a server according to the third embodiment.

The disk enclosure 13b fails and a plurality of disks 15 ("#B1", "#B2", "#B3" . . . ) fail due to the failure of the disk enclosure 13b. The control unit receives allocation of disks 15 from other disk enclosures 13 for substitution with the disks 15 "#B1" and "#B2" based on the failure detection of the disk enclosure 13b. For example, in the case of the disk enclosure failure reconfiguration processing in S67, the control unit receives allocation of the respective disks 15 "#C3" and "#D2" from the disk enclosures 13c and 13d for substitution with the disk 15 "#B1". In the case of the disk enclosure failure reconfiguration processing in S70, the control unit receives allocation of the disk 15 "#D3" from the disk enclosure 13d for substitution with the disk 15 "#B2".

The control unit adds the disk 15 "#C3" contained in the disk enclosure 13c in place of the disk 15 "#B1" contained in the disk enclosure 13b and reconfigures the RAID group 30.

That is, the control unit receives allocation of the disks 15 ("#C2", "#C3", "#C1", "#D1") from the disk enclosures 13c and 13d to reconfigure the RAID group 30. The control unit replicates the disk 15 "#C2" to the disk 15 "#D3" to configure RAID-1. The control unit replicates the disk 15 "#C3" to the disk 15 "#D2" to configure RAID-1.

As a result, the control unit reconfigures the RAID group 30 as a RAID group 30d in combination with two sets of RAID-1.

The server 12 is able to access the RAID group 30 even if either one of the disk enclosures 13c and 13d in the RAID group 30d fails.

Therefore, the storage system 10 is able to reduce data loss due to the failure of a disk enclosure 13 (in units of storage units). The storage system 10 is also able to improve reliability and use the storage resources in an efficient manner during normal operation since the replication of disks 15 does not have to be conducted.

If the status of the failed disk is "RAID-1", the control unit is able to obtain the data from a disk 15 having the status of "RAID-1" that is paired with the failed disk to write the data into a substitute disk. Moreover, the data read time for reconfiguring the RAID group may be shortened by using the disk 15 with the status of "RAID-1" and paired with the failed disk in the reconfiguration of the RAID group.

Next, RAID configuration information after a RAID reconfiguration in combination with RAID-1 is conducted in the third embodiment will be described with reference to FIG. 18. FIG. 18 is an example of RAID configuration information according to the third embodiment.

RAID configuration information 52 illustrated in FIG. 18 is information updated from the RAID configuration information 51 illustrated in FIG. 12 after the RAID reconfiguration in combination with two sets of RAID-1.

The RAID configuration information 52 indicates that the RAID group 30 with the RAID group ID "#0001" is configured by six disks 15 in total. A block number "1" is assigned to two disks 15. A block number "2" is also assigned to two disks 15. Block numbers "3" and "4" are assigned to the other two disks 15, respectively. The RAID configuration information 52 indicates, by the status "RAID-1", that the two disks of the block number "1" configure RAID-1 and that the two disks of the block number "2" configure RAID-1. The RAID configuration information 52 indicates that one disk 15 of the block number "1" is a disk 15 of the disk ID "#2" contained in a DE of the disk enclosure ID "#C". The RAID configuration information 52 indicates that another disk 15 of the block number "1" is a disk 15 of the disk ID "#3" contained in a DE of the disk enclosure ID "#D". The RAID configuration information 52 indicates that one disk 15 of the block number "2" is a disk 15 of the disk ID "#3" contained in a DE of the disk enclosure ID "#C". The RAID configuration information 52 indicates that another disk 15 of the block number "2" is a disk 15 of the disk ID "#2" contained in a DE of the disk enclosure ID "#D". Similarly, the RAID configuration information 52 indicates that the disk 15 of the block number "3" is a disk 15 of the disk ID "#1" contained in a DE of the disk enclosure ID "#C". Similarly, the RAID configuration information 52 indicates that the disk 15 of the block number "4" is a disk 15 of the disk ID "#1" contained in a DE of the disk enclosure ID "#D".

Figure 19:
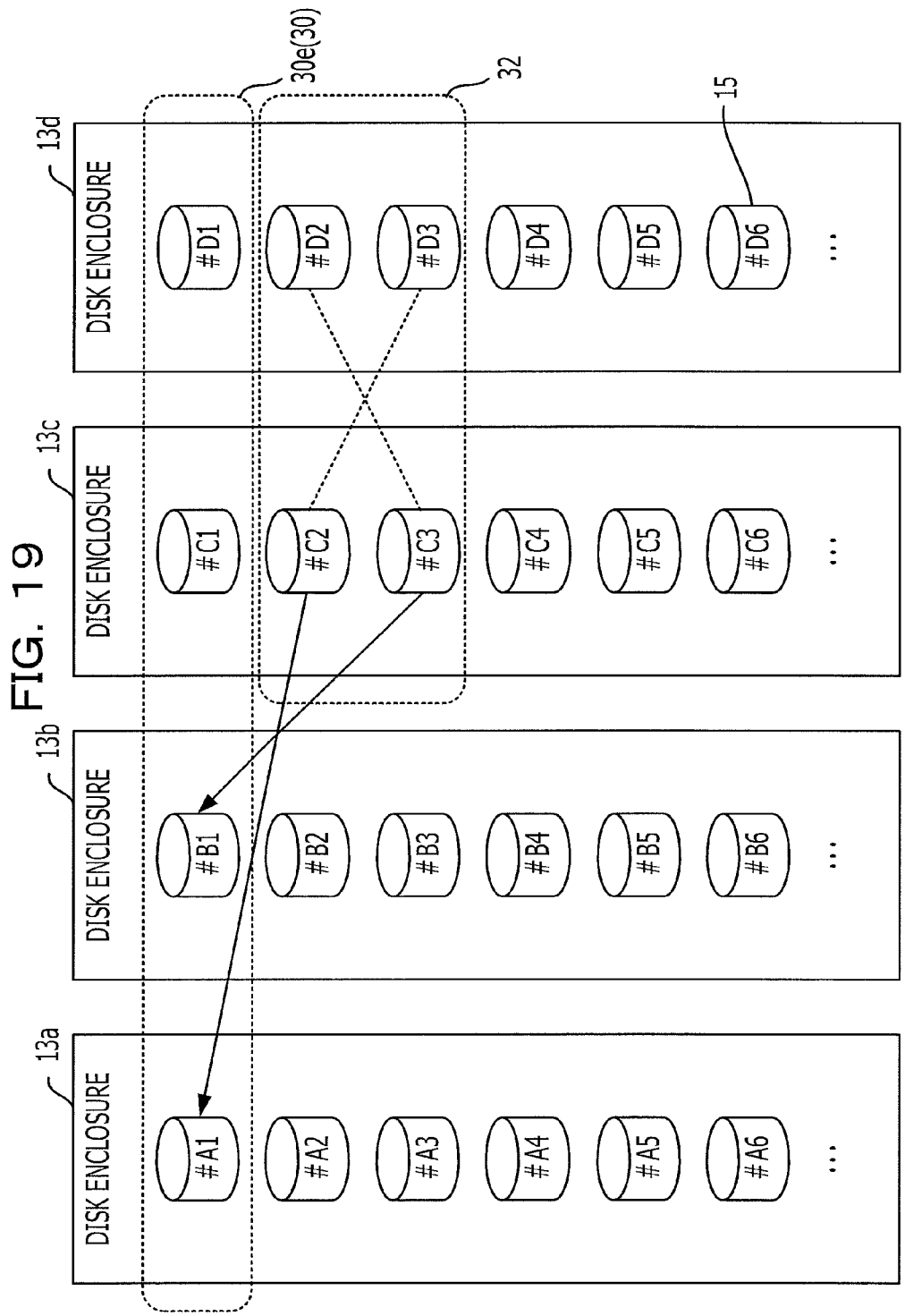
FIG. 19 is a diagram illustrating an example of a RAID group configured by a server according to the third embodiment.

The copy back to the acquired disks and the release of the disks 15 included in RAID-1 will be described with reference to FIG. 19. FIG. 19 is an example of a RAID group configured by a server according to the third embodiment.

The RAID group 30d illustrated in FIG. 17 is configured in combination with RAID-1 due to a failure of the disk enclosures 13a and 13b. When the disk enclosures 13a and 13b are recovered as illustrated in FIG. 19, the control unit acquires a disk 15 (e.g., disk 15 "#A1" and "#B1") from each of the disk enclosures 13a and 13b. The control unit conducts copy back processing from the disk 15 "#C2" included in one RAID-1 to the disk 15 "#A1". The control unit conducts copy back processing from the disk 15 "#C3" included in the other RAID-1 to the disk 15 "#B1". As a result, the server 12 is able to reconfigure a RAID group 30e. The control unit sends a release request to the resource manager 11 for releasing the disks 15 "#C2", "#C3", "#D2", and "#D3" included in RAID-1 as release objects 32, and the allocation of the disks 15 "#C2", "#C3", "#D2", and "#D3" to the server 12 is released.

Therefore, due to the recovery of a disk enclosure 13 (in units of storage units), the storage system 10 is able to recover a RAID group from a state involving RAID-1.

The above processing functions may be implemented by a computer. In this case, programs including the processing contents of the functions of the management device 2, the information processing apparatus 3, the resource manager 11, and the server 12 are provided. The programs are executed by the computer so that the abovementioned processing functions may be implemented on the computer. Programs including the processing contents may be recorded on a computer-readable recording medium. Computer-readable recording media include, for example, a magnetic storage device, an optical disk, a magneto-optic recording medium, a semiconductor memory and the like. The magnetic recording device may be a hard-disk drive (HDD), a flexible disk (FD), or a magnetic tape and the like. The optical disk may be a DVD, a DVD-RAM, a CD-ROM, a CD-R/RW and the like. The magneto-optic recording medium may be a magneto-optical disk (MO).

When the programs are distributed, for example, the programs may be recorded on a portable recording medium such as a DVD or a CD-ROM and the like. Furthermore, the programs may be stored in a server computer and transferred from the server computer to another computer through a network.

The computer that executes the programs may store the programs recorded on a portable recording medium or transferred from a server computer onto the computer's own storage device. The computer then reads the programs from the storage device and implements the processing according to the programs. The computer may read the programs directly from a portable recording medium and conduct processing according to the programs. Moreover, the computer may implement the processing according to obtained programs sequentially transferred from the server computer connected through a network.

At least a portion of the above processing functions may be realized with an electronic circuit such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
a plurality of storage units each containing a plurality of storage devices;
a management device for managing storage devices contained in the plurality of storage units; and
an information processing apparatus including:
a first processor configured to
receive allocation of storage devices by the management device, each of the allocated storage devices being contained in different storage units of the plurality of storage units,
configure a group by involving the allocated storage devices,
detect a failure of a first storage device included in the group, the first storage device being contained in a first storage unit of the different storage units,
determine whether a location of the failure of the first storage device is in the first storage device itself or in a disk enclosure of the group,
receive allocation of a second storage device from a second storage unit of the different storage units, the second storage unit being different from the first storage unit,
reconfigure the group by involving the second storage device in place of the first storage device based on whether the location of the failure of the first storage device is in the first storage device itself or in the disk enclosure of the group,
in response to the group being reconfigured by involving the second storage device, receive allocation of a third storage device from a third storage unit of the plurality of storage units, the third storage unit being different from the first storage unit and the second storage unit and being a storage unit in which a failure has not been detected, and
replicate the second storage device in the third storage device.

2. The storage system according to claim 1, wherein the first processor further configured to
receive allocation of a fourth storage device from a fourth storage unit of the plurality of storage units, the fourth storage unit not containing a storage device included in the group, and
recover the group by replicating the second storage device or the third storage device in the fourth storage device.

3. The storage system according to claim 2, wherein the management device includes:
a second processor configured to
release the allocation of the second storage device and the third storage device after the first processor recovers the group.

4. The storage system according to claim 1, wherein the information processing apparatus further includes:
a storage for storing therein management information for identifying a storage device included in the group, the management information including information for determining whether each storage device has a replication.

5. The storage system according to claim 1, further comprising:
a switch for switching between connection and disconnection of the first processor with each storage unit, wherein
the management device includes:
a second processor configured to
control the switch to allocate a storage device to the information processing apparatus.

6. The storage system according to claim 1, wherein the management device includes:
a second processor configured to
detect a failure of a storage unit, and
report the detected failure to the first processor.

7. A non-transitory computer-readable recording medium having stored therein a program for causing a computer to execute a process, the process comprising:
receiving allocation of storage devices each contained in different storage units of a plurality of storage units;
configuring a group by involving the allocated storage devices;
detecting a failure of a first storage device included in the group, the first storage device being contained in a first storage unit of the different storage units;
determining whether a location of the failure of the first storage device is in the first storage device itself or in a disk enclosure of the group;
receiving allocation of a second storage device from a second storage unit of the different storage units, the second storage unit being different from the first storage unit;
reconfiguring the group by involving the second storage device in place of the first storage device based on whether the location of the failure of the first storage device is in the first storage device itself or in the disk enclosure of the group;
in response to the group being reconfigured by involving the second storage device, receiving allocation of a third storage device from a third storage unit of the plurality of storage units, the third storage unit being different from the first storage unit and the second storage unit and being a storage unit in which a failure has not been detected; and
replicating the second storage device in the third storage device.

8. A method for controlling a storage system including a plurality of storage units each containing a plurality of storage devices, the method comprising:
receiving, by a computer, allocation of storage devices each contained in different storage units of the plurality of storage units;
configuring a group by involving the allocated storage devices;
detecting a failure of a first storage device included in the group, the first storage device being contained in a first storage unit of the different storage units;
determining whether a location of the failure of the first storage device is in the first storage device itself or in a disk enclosure of the group;
receiving allocation of a second storage device from a second storage unit of the different storage units, the second storage unit being different from the first storage unit;
reconfiguring the group by involving the second storage device in place of the first storage device based on whether the location of the failure of the first storage device is in the first storage device itself or in the disk enclosure of the group;
in response to the group being reconfigured by involving the second storage device, receiving allocation of a third storage device from a third storage unit of the plurality of storage units, the third storage unit being different from the first storage unit and the second storage unit and being a storage unit in which a failure has not been detected, and
replicating the second storage device in the third storage device.

* * * * *